(12) United States Patent
Jain et al.

(10) Patent No.: US 11,803,691 B2
(45) Date of Patent: Oct. 31, 2023

(54) TEXT WRAP MODIFICATION USING VARIABLE INSET

(71) Applicant: Adobe Inc., San Jose, CA (US)

(72) Inventors: Ashish Jain, Ashok Vihar (IN); Sanyam Jain, New Delhi (IN)

(73) Assignee: Adobe Inc., San Jose, CA (US)

( * ) Notice: Subject to any disclaimer, the term of this patent is extended or adjusted under 35 U.S.C. 154(b) by 52 days.

(21) Appl. No.: 17/670,703

(22) Filed: Feb. 14, 2022

(65) Prior Publication Data

US 2023/0259690 A1 Aug. 17, 2023

(51) Int. Cl.
*G06F 40/106* (2020.01)
*G06T 11/60* (2006.01)

(52) U.S. Cl.
CPC ............ *G06F 40/106* (2020.01); *G06T 11/60* (2013.01)

(58) Field of Classification Search
CPC ...... G06F 40/189; G06F 40/163; G06F 40/10; G06F 40/103; G06F 40/106; G06T 11/60
See application file for complete search history.

(56) References Cited

U.S. PATENT DOCUMENTS

| | | | | |
|---|---|---|---|---|
| 4,829,470 | A * | 5/1989 | Wang | G06T 11/60 715/788 |
| 6,948,119 | B1 * | 9/2005 | Farmer | G06F 40/103 715/255 |
| 10,078,626 | B1 * | 9/2018 | Voskamp | G06F 40/143 |
| 2005/0132283 | A1 * | 6/2005 | Diwan | G06F 40/103 715/255 |
| 2006/0136818 | A1 * | 6/2006 | Burago | G06F 40/103 715/255 |
| 2009/0222722 | A1 * | 9/2009 | Vaschillo | G06F 40/106 715/245 |
| 2010/0188705 | A1 * | 7/2010 | Giannetti | G06F 40/103 358/1.18 |
| 2011/0173532 | A1 * | 7/2011 | Forman | G06F 40/103 382/176 |
| 2011/0179345 | A1 * | 7/2011 | Capela | G06F 40/103 715/209 |
| 2011/0179351 | A1 * | 7/2011 | Capela | G06F 40/109 715/244 |
| 2012/0324332 | A1 * | 12/2012 | Zaragoza | G06T 11/60 715/863 |
| 2014/0115432 | A1 * | 4/2014 | Turner | G06F 40/114 715/251 |
| 2014/0189502 | A1 * | 7/2014 | Enns | G06T 3/4038 715/247 |
| 2015/0293690 | A1 * | 10/2015 | Chang | G06F 3/04883 715/268 |

(Continued)

*Primary Examiner* — Rami R Okasha
(74) *Attorney, Agent, or Firm* — FIG. 1 Patents

(57) ABSTRACT

In implementations of text wrap modification using variable inset, a display screen of a device displays lines of text wrapped to an inset space maintained between an object boundary and the lines of text. The device implements a text wrap modification module to determine that a penalty value associated with a line of text is reduced if the line of text is extended to include one or more words from a subsequent line of text, determine that the one or more words fit within an additional space for the line of text based on a variable overlap of the line of text into the inset space, and display the one or more words from the line of text as extended to include the one or more words from the subsequent line of text.

20 Claims, 9 Drawing Sheets

(56) References Cited

U.S. PATENT DOCUMENTS

2016/0132464 A1* 5/2016 Imana .................. G06F 3/0483
                                                    715/244
2018/0143842 A1* 5/2018 Weiss ..................... G09G 5/377
2021/0240912 A1* 8/2021 Liu ....................... G06F 40/114

* cited by examiner

TEXT WRAP MODIFICATION USING VARIABLE INSET

BACKGROUND

Generally, graphic designers or other similar computer users utilize computer-based text editing and graphics design software applications to design different types of digital artworks, such as magazine pages, flyers, book pages, advertisements, and any other type of design documents. These digital artworks often include both text and digital objects such as graphics, diagrams, digital images, animations, etc. Text and digital objects often overlap when included together in a digital artwork. For example, a digital object may be incorporated into a digital artwork such that the digital object overlaps text that is also included in the digital artwork. In order to prevent the text and the digital object from overlapping, designers often utilize a text wrap feature to align the text along a boundary of the digital object with a predefined minimum inset spacing in between the text and the boundary of the digital object.

However, conventional techniques fail to create aesthetically pleasing, consistent, and symmetrical inset spacing. This is, in part, because conventional techniques rely on a rigid, non-flexible inset space, which creates inconsistent areas of whitespace between the text and the boundary of the digital object. The problem is further exacerbated when text wrap is applied to a non-rectangular or irregularly shaped digital object. A graphic designer can incur significant development time and effort manually adjusting text wrap parameters and digital object positioning in order to create text wrap with acceptable inset spacing. Alternatively, a graphic designer can apply text justification, which introduces variable spacing between words in order to achieve alignment. However, text wrap used in conjunction with text justification often creates significantly shortened lines of text, which can cause the justified lines of text to include undesirable spacing between words.

SUMMARY

This Summary introduces features and concepts of text wrap modification using variable inset, which is further described below in the Detailed Description and shown in the Figures. This Summary should not be considered to describe essential features of the claimed subject matter, nor used to determine or limit the scope of the claimed subject matter.

Aspects of text wrap modification using variable inset are described. In implementations, a computing device can implement a text wrap modification module to modify text wrap applied to a creative project that includes a digital object and lines of text. For example, a user of the computing device may provide the lines of text and the digital object as input to a text editing user interface. In response, the text editing user interface can display the lines of text that wrap conforming to an object boundary of the digital object, while maintaining an inset space between the object boundary and the lines of text. The lines of wrapped text can then be provided as input to the text wrap modification module.

The text wrap modification module includes a penalty calculation module to calculate penalty values for the lines of text. The penalty values represent a measure of deviation from optimal text conditions, such as an optimal inset space. Thus, a penalty value for a line of text can represent a measure of deviation of the line of text from the optimal inset space. Accordingly, the penalty value can be calculated based, in part, on a distance between an end of a respective line of text and the inset space. The text wrap modification module also includes a space determination module to determine an additional space available for each line of text based on a variable overlap into the inset space. The variable overlap defines a portion of the inset space into which the lines of text are permitted to overlap. Therefore, the additional space available for each line of text is between an end of a respective line of text and into the inset space.

The text wrap modification module also includes a line extension module to extend at least some of the lines of text to include one or more words from a subsequent line of text. To do so, the line extension module makes a first determination that the one or more words from the subsequent line of text fit within the additional space for a line of text. Further, the line extension module makes a second determination that extending the line of text to include the one or more words results in a reduced penalty value for the line of text. In response to making the first and second determinations, the line extension module extends the line of text to include the one or more words. The line extension module is configured to iteratively repeat the extending process for all lines of text wrapped around the digital object.

The text wrap modification module also includes an inset adjustment module to adjust a width of the inset space between the lines of text and a second side of the object boundary based on an average of the inset space determined between the lines of text and a first side of the object boundary. In some implementations, the lines of text can be displayed in two columns on either side of the digital object. In accordance with these implementations, the inset adjustment module can determine an average inset space maintained between the lines of text in the first column and the object boundary. Further, the inset adjustment module can adjust the inset space maintained between the lines of text in the second column and the object boundary to the average inset space. The text wrap modification module can then display the lines of text as extended by the line extension module and the inset space as adjusted by the inset adjustment module in the text editing user interface.

BRIEF DESCRIPTION OF THE DRAWINGS

Implementations of text wrap modification using variable inset are described with reference to the following Figures. The same numbers may be used throughout to reference similar features and components that are shown in the Figures.

DETAILED DESCRIPTION

Overview

Figure 1:
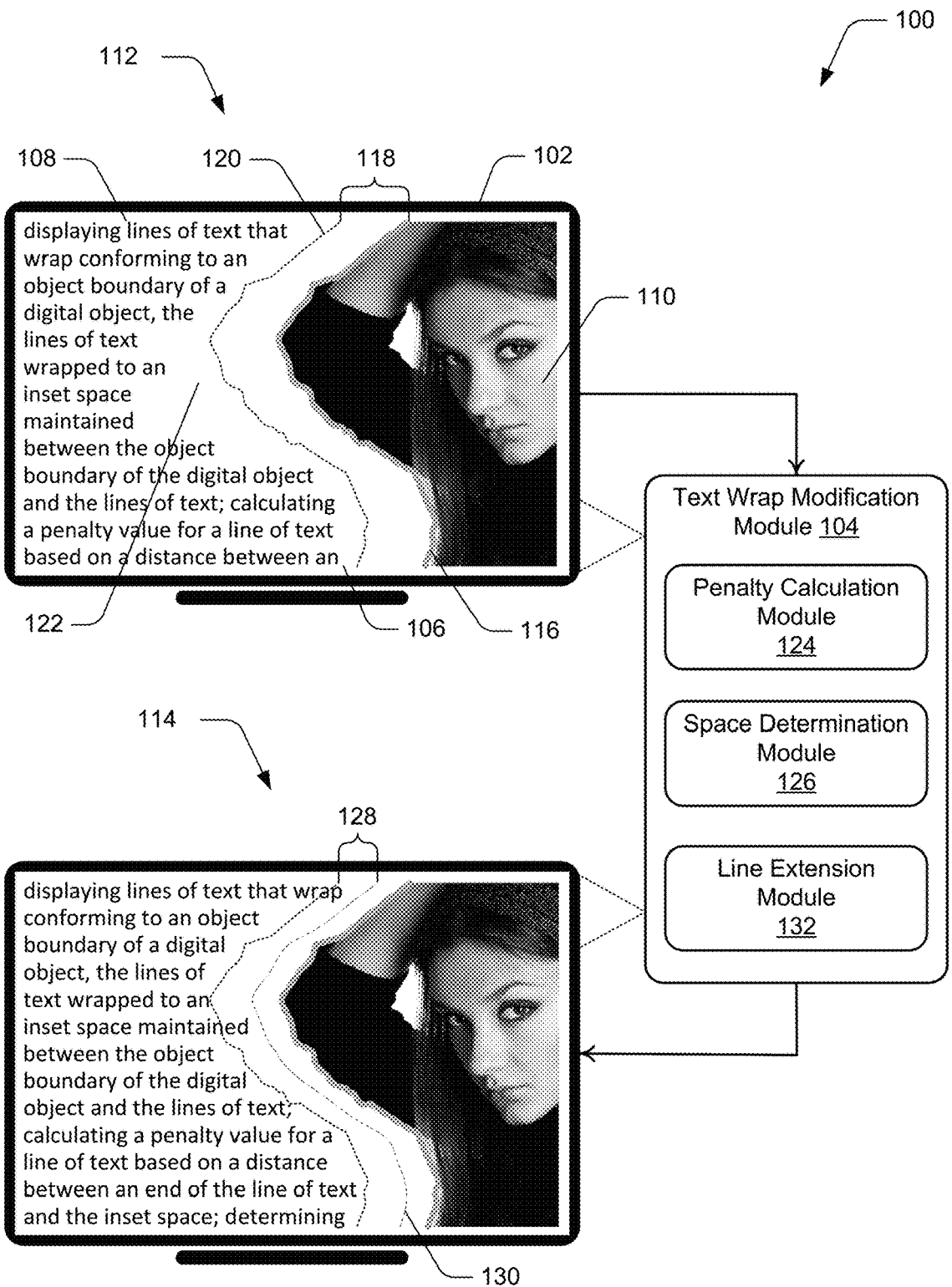
FIG. 1 illustrates an example of text wrap modification using variable inset implemented with a computing device in accordance with embodiments described herein.

Implementations of text wrap modification using variable inset are described, and provide a text wrap modification module for modifying text wrap based on inset space overlap. Many different text editing and graphics design software applications are utilized by graphic designers to design digital artworks, such as magazine pages, flyers, book pages, advertisements, and the like. These digital artworks often include both text and digital objects. As used herein, the term "digital object" includes, for example, a graphic, a diagram, a digital image, an animation, a vector object, a raster image, and the like. In order to prevent the text and the digital object from overlapping, graphic designers often apply text wrap. Generally, applying "text wrap" as described herein causes lines of text to surround the digital object without the lines of text overlapping an object boundary of the digital object.

In aspects of text wrap modification using variable inset, a user of a device application can provide user input to apply text wrap to a digital creative project that includes the lines of text and the digital object. In response, the device application can apply a simple text wrap approach, which causes a user interface of the device application to display the lines of text that wrap conforming to an object boundary of the digital object, while maintaining an inset space between the lines of text and the object boundary. Generally, an "object boundary" as used herein is an outline or border of a respective digital object. Further, as used herein, the term "inset space" refers to an amount of space to be maintained between an end of a respective line of text and the object boundary.

Notably, conventional or typical text wrap approaches have a rigid, non-flexible inset space, which do not permit the lines of text to overlap into the inset space, even if the overall appearance of the text wrap can be improved. As a result, the actual space that is maintained between the lines of text and the object boundary can vary greatly among the lines of text. For example, a conventional text wrap approach can push a long word from a line of text to a subsequent line of text, resulting in a relatively large space between an end of the line of text and the inset space. In contrast, an additional line of text can end precisely at or very near the inset space, resulting in a relatively small space between an end of the additional line of text and the inset space. Due to this inconsistent spacing, the lines of text as displayed in accordance with a conventional or typical text wrap approach do not adequately follow the contours of the object boundary. Moreover, the actual space maintained between the lines of text of a conventional text wrap approach can be much larger than the intended inset space. These challenges are further exacerbated when the object boundary is non-linear or irregularly shaped.

Conventional text wrap approaches fail to provide a solution for these challenges. Rather, a user of a conventional text wrap approach is required to incur significant development time and effort in manually adjusting the inset space and/or the positioning of the digital object. Moreover, if the user makes subsequent modifications to the text and/or the properties of the digital object, the user incurs similar time and effort to re-adjust the inset space and/or the positioning of the digital object. Alternatively, the user of the conventional text wrap approach can apply text justification to the lines of text, which introduces variable spacing between words to achieve alignment. However, applying text wrap in conjunction with text justification often creates significantly shortened lines of text, which can cause the justified lines of text to include undesirable spacing between words.

In aspects of the described text wrap modification technique using variable inset, a computing device or mobile device implements a text wrap modification module, which includes a penalty calculation module, a space determination module, a line extension module, and an inset adjustment module. The text wrap modification module can receive the lines of text wrapped in accordance with the simple text wrap approach, as described above. For example, the text wrap modification module can receive the lines of text and the digital object as input by the user, as well as various text wrap parameters, such as the object boundary and the inset space.

The penalty calculation module of the text wrap modification module can calculate penalty values for the lines of text. Generally, a "penalty value" is a measure of deviation from optimal text conditions, such as an optimal inset space, optimal spacing between words, and an optimal glyph width. In accordance with this functionality, a larger penalty value represents a larger deviation from the optimal text conditions. In aspects of text wrap modification using variable inset, the penalty value calculated for an individual line of text is based, in part, on a distance between an end of the line of text and the inset space. For example, a line of text that ends relatively closer to the inset space has a lower penalty value than a line of text that ends relatively further from the inset space.

The space determination module of the text wrap modification module can determine an additional space for each line of text based on a variable overlap into the inset space. Notably, as used herein, the term "variable overlap" refers to a portion of the inset space into which the lines of text are permitted to overlap. The additional space available for a line of text is the space from an end of the line of text and into the inset space. For example, the space determination module determines as the additional space, the space from the end of the line of text to the inset space combined with the portion of the inset space defined by the variable overlap.

The line extension module of the text wrap modification module can extend a line of text to include one or more words from a subsequent line of text based on the penalty value calculated for the line of text and the additional space available for the line of text. To do so, the line extension module identifies a first word that is being pushed from the line of text to a subsequent line of text. The line extension module can then determine, based on a length of the first word, whether the first word fits within the additional space available for the line of text. Additionally, the line extension module can leverage the penalty calculation module to determine a penalty value for the line of text as extended to include the next word. The line extension module can then compare the penalty values of the extended line of text and the unmodified line of text to determine whether the extended line of text has a lower penalty value than the unmodified line of text. If the line extension module determines that the first word fits within the additional space for the line of text and determines that the extended line of text is associated with a reduced penalty value, then the line extension module extends the line of text to include the first word.

The line extension module can then iteratively repeat this process for a next iterative word (e.g., for a second word from the subsequent line of text, for a third word from the subsequent line of text, and so on) until either the next iterative word does not fit within the additional space or the line of text as extended to include the next iterative word is not associated with the reduced penalty value (or exceeds the reduced penalty value). The line extension module can also repeat this process for additional lines of text until all lines of text affected by the inset space are extended in accordance with techniques implemented by the text wrap modification module.

The line extension module, therefore, causes or enables at least some of the lines of text to extend partially into the inset space through utilization of the variable overlap. Thus, in comparison to conventional techniques, the lines of text can end much closer to the inset space, and some lines of text may partially overlap into the inset space, providing an improved visual appearance of the text wrapped next to the digital object. As a result, the lines of text as wrapped by the text wrap modification module follow the contours of the object boundary much more closely than conventional techniques. Further, the actual space maintained between the lines of text and the object boundary is closer to the intended inset space.

In some implementations, the lines of text can be displayed in two columns on either side of the digital object. In such implementations, the actual space maintained between the lines of text in a first column and the object boundary can vary among the lines of text, while the actual space maintained between the lines of text in a second column and the object boundary can remain consistent among the lines of text. This is because of a flush-ragged alignment which can cause the lines of text to be flush on one side of a respective column (e.g., on the left side) and ragged on another side of the respective column (e.g., on the right side). Due to this, the digital object can appear off-center with respect to the two columns of text.

In accordance with these implementations, the inset adjustment module of the text wrap modification module can adjust a width of the inset space between the lines of text and a second side of the object boundary based on an average of the inset space determined between the lines of text and a first side of the object boundary. For example, the inset adjustment module can determine an average inset space maintained between the lines of text in the first column and the object boundary. In some implementations, the lines of text in the first column evaluated by the inset adjustment module are previously extended by the line extension module, as discussed above. Alternatively or additionally, the lines of text in the first column evaluated by the inset adjustment module are the lines of text wrapped in accordance with the simple text wrap approach, as discussed above. The inset adjustment module can then generate an adjusted inset space to be maintained between the lines of text in a second column and the object boundary. The adjusted inset space can be equal to the average inset space, causing the digital object to appear more centered with respect to the two columns of text, as compared to conventional techniques.

While features and concepts of text wrap modification using variable inset can be implemented in any number of different devices, systems, networks, environments, and/or configurations, implementations of text wrap modification using variable inset are described in the context of the following example devices, systems, and methods.

FIG. 1 illustrates an example 100 of text wrap modification using variable inset, implemented with a computing device 102 that executes a text wrap modification module 104 as a software application, or as a module of a software application, on a processor or processing system of the computing device 102. As detailed in a device description of the example device shown in FIG. 4, the computing device 102 can display a text editing user interface 106 of a computer application implemented by the computing device 102. For example, many different types of computer applications implement features or functions that provide for graphic design, publication development, document design, artistic creations, and the like.

In this example, a user of the computing device 102 provides text 108 as input to the text editing user interface 106. The text 108, for instance, includes glyphs in the form of letters, numbers, symbols, and the like. Upon receiving the text 108 as input, the text editing user interface 106 displays the text 108. In one example, the text 108 is displayed in vertically stacked horizontal lines of text 108 in the text editing user interface 106, as shown. The user of the computing device 102 can also provide a digital object 110 as an input to the text editing user interface 106. The digital object 110, for instance, can be a graphic, a diagram, a digital image, an animation, a vector object, a raster image, and so on. By way of example, the digital object 110 can be obtained from data storage of the computing device 102, from cloud storage, downloaded from the Internet, and the like. The text editing user interface 106 then displays a generated creation that includes the lines of text 108 and the digital object 110. Notably, the lines of text 108 and the digital object 110 can be displayed such that the lines of text 108 at least partially overlap the digital object 110.

The user can provide further input to apply text wrap to the text 108 and the digital object 110 displayed in the text editing user interface 106. Alternatively or additionally, text wrap can be applied automatically as the text 108 and the digital object 110 are provided as input. Generally, applying text wrap as described herein causes the lines of text 108 to surround the digital object 110 without the text 108 and the digital object 110 overlapping. Notably, example 112 depicts a first instance of the text editing user interface 106 after a simple text wrap approach is applied, and example 114 depicts a second instance of the text editing user interface 106 after applying techniques described herein for text wrap modification using variable inset.

As shown in example 112, applying a simple text wrap approach causes the text editing user interface 106 to display the lines of text 108 that wrap conforming to an object boundary 116 of the digital object 110, while maintaining an inset space 118 between the object boundary 116 of the digital object 110 and the lines of text 108. The object boundary 116 is the outline or border of the digital object 110. The inset space 118 is a predefined amount of space to be maintained between the digital object 110 and the lines of text 108. For instance, the inset space 118 can be defined as a minimum unit of length, such as a minimum number of pixels, to be maintained between the digital object 110 and the lines of text 108 when a simple text wrap is applied. Therefore, the lines of text 108 generally follow the contours of the object boundary 116 of the digital object 110 without overlapping into the inset space 118. Notably, an inset edge 120 is depicted which generally follows the contours of the object boundary 116 and is extended from the digital object 110 by the inset space 118. The inset edge 120 illustrates a boundary which the lines of text 108 are not permitted to overlap. It should be noted that the inset edge 120 is included in FIG. 1 for illustrative purposes, and the text editing user interface 106 can be displayed with or without the inset edge 120.

Generally, conventional or typical text wrap approaches have a rigid, non-flexible inset space, such as the inset space 118 shown in example 112. As a result, words are not permitted to overlap into the inset space 118, even if the overall appearance of the text wrap can be improved. For instance, if the word "wrap" were to be moved from the second line of text 108 to the end of the first line of text, then the end of the first line of text 108 would overlap slightly into the inset space 118. Additionally, moving the word "wrap" from the second line of text 108 to the end of the first line of text provides an appearance of the first line of text 108 following the contours of the object boundary 116 more closely.

As noted above, example 112 depicts an example text editing user interface 106 after applying a simple text wrap approach. As shown, the spacing between the ends of the lines of text 108 and the inset edge 120 varies greatly among the lines of text 108. For instance, a space 122 between the ends of the lines of text 108 and the inset edge 120 is relatively much larger than other areas in the text editing user interface 106. As a result, the lines of text 108 displayed in the text editing user interface 106 of example 112 do not adequately follow the contours of the object boundary 116 of the digital object 110. Moreover, as further shown by the space 122, the actual spacing between the lines of text 108 and the digital object 110 is much larger than the intended inset space 118. These problems are further exacerbated when the object boundary 116 is non-linear and/or irregularly shaped, as shown in example 112.

Conventional text wrap approaches fail to provide a solution for the above-mentioned challenges. Rather, conventional text wrap approaches require a user to incur significant development time and effort in manually adjusting the shaping of the inset edge 120 and the positioning of the digital object 110. Additionally, if the user makes subsequent modifications to the text 108 and/or the properties of the digital object 110, the user incurs similar time and effort to re-adjust the shaping of the inset edge 120 and the positioning of the digital object 110. An alternative conventional approach is to apply text justification to the text 108, which introduces variable spacing between words in order to obtain alignment with the inset edge 120. However, text wrap often creates significantly shortened lines of text 108, which causes justified lines of text to include undesirable spacing between words.

Figure 4:
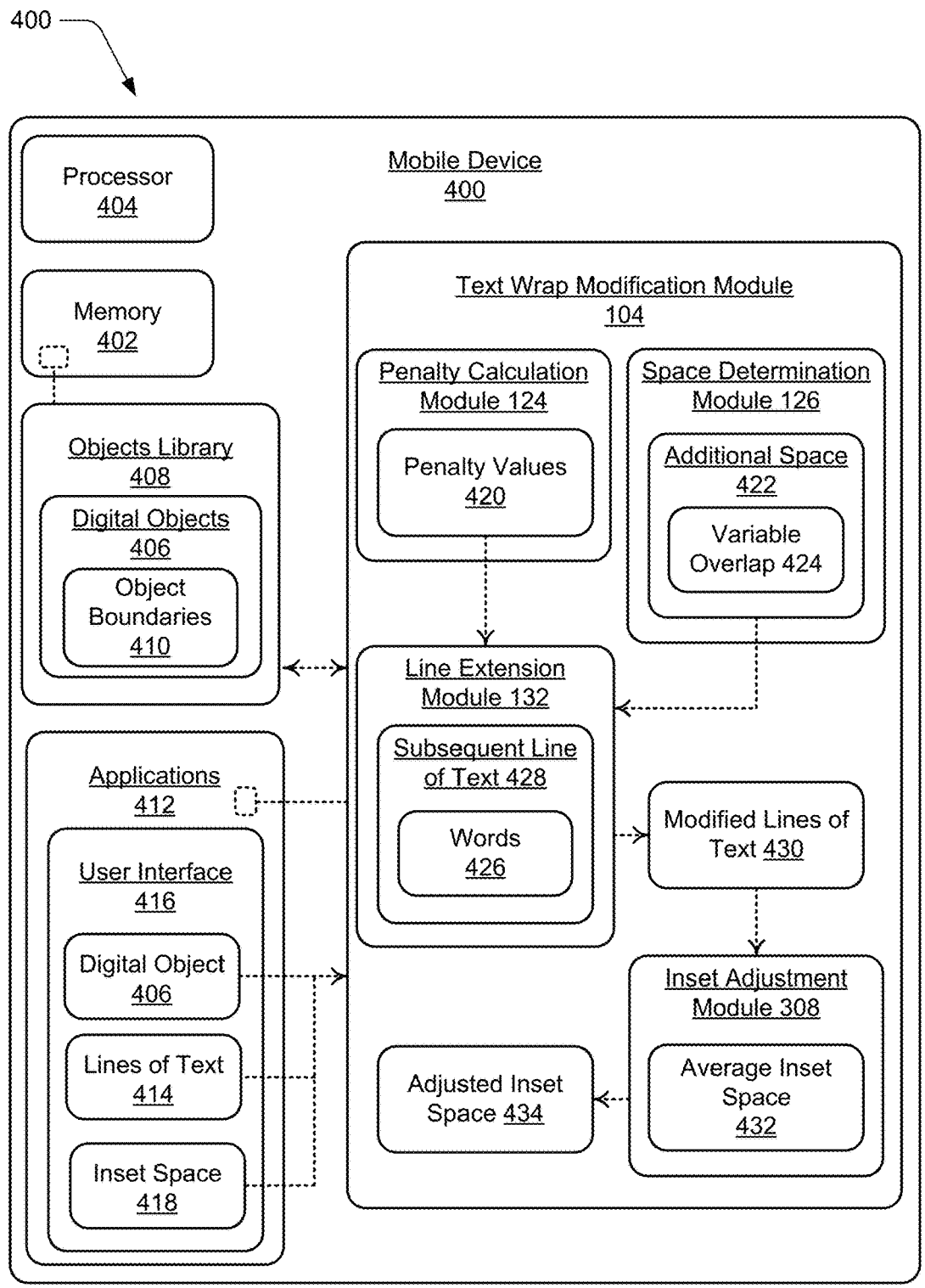
FIG. 4 illustrates an example device in which aspects of text wrap modification using variable inset can be implemented.

In implementations, and as further detailed in the device description of the example device shown in FIG. 4, the computing device 102 implements the text wrap modification module 104 (e.g., as a module, a component, a software application, etc.). The text wrap modification module 104 can receive the lines of text 108 and the digital object 110 as input by the user. Similarly, the text wrap modification module 104 can receive the text wrap parameters, including the object boundary 116, the inset space 118, and the inset edge 120.

The text wrap modification module 104 includes a penalty calculation module 124 that calculates penalty values for the lines of text 108 using a penalty function. Generally, a penalty value, as described herein, is a measure of deviation from optimal text conditions, which can include an optimal amount of inset space, an optimal amount of spacing between individual words of the lines of text 108, an optimal glyph width for the individual glyphs in the lines of text 108, and so on. The optimal text conditions are relative with respect to the overall appearance of the lines of text 108, as depicted in the image and text-wrapped around the digital object 110. Each of the text conditions can be given a weight to reflect different levels of importance for the particular text conditions. The penalty function then calculates deviation of the actual text conditions from the optimal text conditions based on the weight. The weighted deviations are aggregated to generate a penalty value that reflects a measure of deviation from all of the optimal text conditions. Accordingly, a larger penalty value is representative of a larger deviation from the optimal text conditions.

In implementations of text wrap modification using variable inset as described herein, the penalty value is calculated for an individual line of text 108 based, in part, on a distance between an end of the individual line of text 108 and the inset space 118. For example, the inset space 118 represents the optimal inset space for the penalty function, as described above, and the inset edge 120 illustrates the optimal location for the individual line of text 108 to end. In accordance with this functionality, lines of text 108 that end near or at the inset edge 120 have lower penalty values than lines of text 108 that end further from the inset edge 120.

The text wrap modification module 104 also includes a space determination module 126, which is configured to determine additional space available for a particular line of text 108 based on a variable overlap 128 into the inset space 118. The variable overlap 128 defines a portion of the inset space 118 into which the lines of text 108 are permitted to overlap. For example, the variable overlap 128 can be defined as a percentage of the inset space 118 that the lines of text 108 are permitted to extend into. Additionally or alternatively, the variable overlap 128 can be defined as a measure of length (e.g., a number of pixels) from the inset edge 120 where the lines of text 108 are permitted to end. As an example of this functionality, example 114 depicts at least some of the lines of text 108 overlapping into the inset space 118. Notably, the variable overlap 128 defines a maximum amount of the inset space 118 that the lines of text 108 are permitted to overlap. As such, example 114 includes an overlap edge 130 that illustrates a boundary for the variable overlap 128, past which the lines of text 108 are not permitted to extend. Thus, as shown in example 114, the lines of text 108 extend into the inset space 118 but not past the overlap edge 130.

Figure 2:
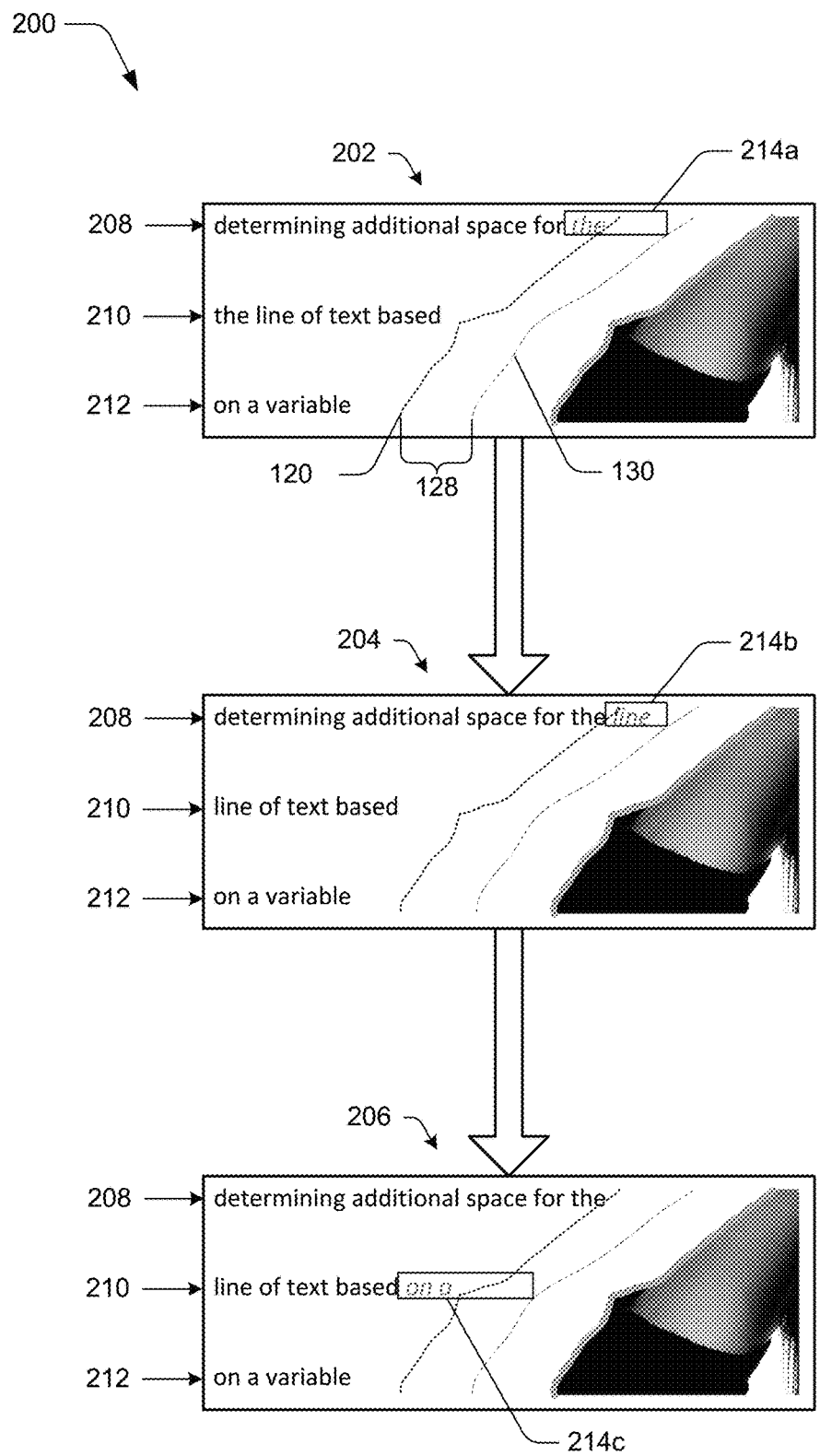
FIG. 2 further illustrates example aspects of text wrap modification using variable inset in accordance with one or more implementations.

In implementations, and as further described in the discussion of FIG. 2, the additional space available for a particular line of text 108 determined by the space determination module 126 is between the end of the line of text 108 and into the variable overlap 128 of the inset space 118. For example, the additional space available for a line of text 108 is the space between an end of the line of text 108 and the overlap edge 130.

The text wrap modification module 104 also includes a line extension module 132 configured to extend a line of text 108 to include one or more words from a subsequent line of text based on the penalty value and the additional space available for the line of text 108. To do so, the line extension module 132 identifies a next word that is pushed from the end of a line of text 108 to the subsequent line of text. For instance, as shown in example 112, the line extension module 132 identifies the word "wrap" as the next word that is pushed from the first line of text 108 to the second line of text 108.

The line extension module 132 is further configured to leverage the penalty calculation module 124 to determine whether extending the line of text 108 to include the next word (e.g., "wrap") results in a reduced penalty value for the line of text 108. For instance, the penalty calculation module 124 determines a penalty value for the line of text 108 without the next word included in the line of text 108. The penalty calculation module 124 further determines the penalty value for the line of text 108 as extended to include the next word from the subsequent line of text. The line extension module 132 then determines whether the penalty value calculated for the extended line of text 108 is less than the penalty value of the unmodified line of text 108. As mentioned above, the penalty value is based, in part, on the distance between an end of the line of text 108 and the inset edge 120. Thus, the penalty value for the extended line of text 108 is reduced if the end of the extended line of text 108 is closer to the inset edge 120 than the unmodified line of text 108.

The line extension module 132 is further configured to determine whether the next word fits within the additional space available for the line of text 108, as determined by the space determination module 126. To do so, the line extension module 132 determines a length of the next word from the subsequent line of text based on, for example, a font type, a font size, a number of glyphs in the next word, and a glyph width of the individual glyphs included in the next word. The next word is determined to fit in the line of text 108 if the determined length of the next word is less than the additional space available for the line of text 108. If the line extension module 132 determines that the next word fits within the additional space for the line of text 108, and also determines that the line of text 108 as extended to include the next word from the subsequent line of text results in the reduced penalty value for the line of text 108, then the line extension module 132 extends the line of text 108 to include the next word.

By way of example and as shown in example 114, the first line of text 108 as extended to include the word "wrap" from the subsequent line of text results in the first line of text 108 ending closer to the inset edge 120 than as depicted in example 112. As a result, the extended line of text 108 is associated with a reduced penalty value. Further, the word "wrap" fits within the space between the end of the word "that" and the overlap edge 130. Therefore, the word "wrap" fits within the additional space available for the first line of text 108. Accordingly, as shown in example 114, the line extension module 132 extends the first line of text 108 to include the word "wrap."

The line extension module 132 is further configured to iteratively extend the line of text 108 to include additional words from the subsequent line of text if the penalty value is reduced and the additional words from the subsequent line of text fit within the additional space for the line of text 108. For example, after extending a line of text 108 to include a first word from a subsequent line of text, the line extension module 132 determines whether a second word from the subsequent line of text 108 fits within the additional space available for the line of text 108, and also determines whether the line of text 108 as further extended to include the second word from the subsequent line of text results in the reduced penalty value for the line of text 108. If it is so determined, then the line extension module 132 extends the line of text 108 to also include the second word from the subsequent line of text. This process is repeated until either the next iterative word from the subsequent line of text does not fit within the additional space available for the line of text 108, or inclusion of the next iterative word in the line of text 108 does not result in the reduced penalty value for the line of text 108.

Further, the line extension module 132 iteratively extends each additional line of text 108 wrapped around the digital object 110. For example, the line extension module 132 determines that a next iterative word from a second line of text 108 does not fit within the additional space available for a first line of text 108. In response, the line extension module 132 extends the second line of text 108 to include one or more words from a third line of text 108 based on a reduced penalty value for the second line of text 108 and a determination that the one or more words fit within the additional space available for the second line of text 108. This process is repeated until all lines of text 108 affected by the inset space 118 are extended in accordance with techniques implemented by the text wrap modification module 104, as described herein.

The text wrap modification module 104 further causes display of the lines of text 108 in the text editing user interface 106 as extended by the line extension module 132. As shown in example 114, the text wrap modification module 104 outputs and displays an optimal configuration for the lines of text 108. For instance, the lines of text 108 as shown in example 114 follow the contours of the object boundary 116 much more closely than the lines of text 108 as shown in example 112. Moreover, the lines of text 108 as shown in example 114 end much more closely to the inset edge 120 than the lines of text 108 as shown in example 112. Further, the spacing between the lines of text 108 and the inset edge 120 varies greatly among the lines of text 108 in example 112, as illustrated by the space 122. In comparison, the spacing in example 114 between the lines of text 108 and the inset edge 120 are much more consistent, although some lines of text 108 partially overlap into the inset space 118. Thus, as opposed to conventional techniques, the techniques implemented by the text wrap modification module 104 create a text wrap with consistent and aesthetically pleasing spacing between the lines of text 108 and the digital object 110.

In some implementations, the text wrap modification module 104 can initiate to extend the lines of text 108 in response to receiving a selection of a user-selectable control. The user-selectable control, for instance, can be displayed in response to selecting the digital object 110 (e.g., with a double-click input, a right-click input, a tap and hold input, a drag-n-drop input, and the like), or selecting a tab displayed in the text editing user interface 106 to initiate display of a text wrap context menu. In response to receiving a selection of the user-selectable control, the text wrap modification module 104 can initiate to extend the lines of text 108 and display an optimal configuration for the lines of text 108. Alternatively or additionally, the text wrap modification module 104 can initiate to extend the lines of text 108 and display the optimal configuration for the lines of text 108 automatically as the text 108 and the digital object 110 are provided as input. Regardless, the text wrap modification module 104 creates a text wrap with consistent and aesthetically pleasing spacing, without the need to manually adjust the shape of the inset edge 120 and/or the positioning of the digital object 110, as is required by conventional techniques.

In implementations of text wrap modification using variable inset as described herein, the text wrap modification module 104 can receive user input to alter the lines of text 108 and/or the digital object 110. For example, a user of the computing device 102 can delete or add text, change font size, change font type, alter the size or positioning of the digital object 110, and so on. In response, the text wrap modification module 104, automatically and without further user input, determines the optimal configuration for the lines of text 108 based on penalty values determined for the lines of text 108 and the additional space available for each line of text 108.

By way of example, the text wrap modification module 104 can receive a user input to alter a line of text 108. In response, the text wrap modification module 104, adjusts the configuration of the altered line of text 108 based on a reduced penalty value for the altered line of text 108 and a determination that one or more words from a subsequent line of text fit within the additional space determined for the altered line of text 108. This process is then iteratively repeated for each line of text 108 subsequent to the altered line of text 108. The adjusted configuration for the lines of text 108 can then be displayed in the text editing user interface 106, without further user input. Thus, as opposed to conventional techniques, the text wrap modification module 104 determines and displays the optimal configuration for the lines of text 108 without the need to manually re-adjust the shape of the inset edge 120 and/or the positioning of the digital object 110.

In some implementations, the text wrap modification module 104 can display user-selectable controls in the text editing user interface 106 that are offered as advanced user options to independently adjust the variable overlap 128 and the inset space 118. The user-selectable controls can include a first user-selectable control for increasing or decreasing the optimal inset space 118 to be maintained between the lines of text 108 and the digital object 110, and a second user-selectable control for increasing or decreasing the variable overlap 128. In accordance with this functionality, the lines of text 108 can be modified in near real-time as the text wrap modification module 104 receives input to modify the inset space 118 and/or the variable overlap 128 via the user-selectable controls. The selectable controls can be displayed such that the selectable controls, the lines of text 108, and the digital object 110 are all visible in the text editing user interface 106. For example, the selectable controls can be displayed in the text editing user interface 106 in a side bar located proximate the creation. In this way, changes in the configuration of the lines of text 108 are visible to the user in near-real time as the user makes modifications to the inset space 118 and/or the variable overlap 128.

FIG. 2 further illustrates example aspects 200 of text wrap modification using variable inset in accordance with one or more implementations. As noted above, the line extension module 132 is configured to iteratively extend the lines of text to include one or more words from a subsequent line of text. In this example, the text wrap modification module 104 progresses through stages 202, 204, 206 in iteratively extending lines of text 208, 210, 212. The example progression also includes the inset edge 120, the variable overlap 128, and the overlap edge 130, as further discussed above in relation to FIG. 1.

The first stage 202 of the progression illustrates the lines of text 208, 210, 212 prior to extension by the line extension module 132. By way of example, the first stage 202 of the progression shows the lines of text 208, 210, 212 after applying a conventional text wrap approach. In the first stage 202 of the progression, the penalty calculation module 124 determines a penalty value for an unmodified version the first line of text 208. As noted above, the penalty value is based on a distance between the end of the first line of text 208 and the inset edge 120. In some implementations, the penalty value can also be based on other factors such as spacing between the individual words of the first line of text 208 and the glyph width of the individual letters included in the first line of text 208. Also in the first stage 202 of the progression, the space determination module 126 determines an additional space 214a available for the unmodified version of the first line of text 208. As shown, the additional space 214a is the space between the end of the first line of text 208 and the overlap edge 130.

The line extension module 132 then determines whether it is appropriate to extend the first line of text 208 to include a next word from the second line of text 210. In doing so, the line extension module 132 determines whether extending the first line of text 208 to include the word "the" from the beginning of the second line of text 210 results in a reduced penalty value for the first line of text 208, and also determines whether the word "the" fits within the additional space 214a for the first line of text 208. Notably, the first stage 202 of the progression illustrates the word "the" in a lighter shade to illustrate its potential inclusion in the first line of text 208.

By way of example, the penalty calculation module 124 determines a penalty value for the first line of text 208 as extended to include the word "the" from the second line of text 210. If the penalty value of the extended version of the first line of text 208 is less than the penalty value of the unmodified version of the first line of text 208, then extending the first line of text 208 results in the reduced penalty value for the first line of text 208. As shown, inclusion of the word "the" results in the extended version of the first line of text 208 ending closer to the inset edge 120 than the unmodified version of the first line of text 208. Since the penalty value is lower when the end of the first line of text 208 is closer to the inset edge 120, the penalty value for the first line of text 208 is reduced.

However, as noted above, the penalty value can also be based on additional factors such as spacing between individual words in a line of text and/or glyph width of individual glyphs included in the line of text. In these implementations, extending the line of text to include the next word from the subsequent line of text can result in reducing the spacing between the words in the line of text and/or reducing the glyph width of the glyphs in the line of text in order to fit the next word within the additional space. In accordance with this functionality, the extended version of the line of text can end closer to the inset edge 120 than the unmodified version of the line of text. However, the reduced spacing and the reduced glyph width can cause the overall penalty value to be increased for the extended version of the line of text. Thus, in these situations, the penalty value may not be reduced despite the extended version of the line of text ending closer to the inset edge 120 than the unmodified version of the line of text.

Returning to stage 202, the space determination module 126 determines whether the word "the" fits within the additional space 214a for the first line of text 208. Since the word "the" clearly fits within the additional space 214a determined for the first line of text 208, and the extended version of the first line of text 208 results in the reduced penalty value, the line extension module 132 extends the first line of text 208 to include the word "the," as shown at stage 204.

At stage 204, the line extension module 132 determines whether it is appropriate to further extend the first line of text 208 to include a next iterative word from the second line of text 210. In doing so, the line extension module 132 determines whether extending the first line of text 208 to include the word "line" from the second line of text 210 results in a reduced penalty value for the first line of text 208, and also determines whether the word "line" fits within the additional space 214b for the first line of text 208. Notably, the second stage 204 of the progression illustrates the word "line" in a lighter shade to illustrate its potential inclusion in the first line of text 208.

For example, the penalty calculation module 124 determines a penalty value for the first line of text 208 as further extended to include the word "line" from the second line of text 210. As shown, further extension of the first line of text 208 to include the word "line" results in the first line of text 208 ending further from the inset edge 120. For example, the first line of text 208 ends closer to the inset edge 120 without the word "line" included in the first line of text 208. Since the penalty value is higher when the end of the first line of text 208 is further from the inset edge 120, the penalty value for the first line of text 208 is not reduced at stage 204. Thus, although the word "line" fits within the additional space 214b allotted by the variable overlap 128 into the inset space 118, the line extension module 132 does not further extend the first line of text 208 to include the word "line," as shown at stage 206.

As noted above, a line of text is iteratively extended until it is determined that extending the line of text is not appropriate based on either the penalty value or the additional space available for the line of text. Therefore, after determining that extension of the first line of text 208 is not appropriate based on the penalty value, the line extension module 132 repeats the process shown and described with reference to stages 202 and 204 for the second line of text 210. For example, the line extension module 132 determines whether it is appropriate to extend the second line of text 210 to include one or more words from the third line of text 212. It should be noted that the second line of text 210 evaluated by the line extension module 132 is not the original version of the second line of text 210. Rather, the line extension module 132 evaluates the second line of text 210 as modified to no longer include the word "the," which was incorporated into the first line of text 208.

In accordance with this functionality, the line extension module 132 determines whether extending the second line of text 210 to include one or more words from the third line of text 212 results in a reduced penalty value for the second line of text 210, and also determines whether the one or more words fit within the additional space 214c for the second line of text 210. As shown at stage 206, the words "on a" fit within the additional space 214c. Further, extending the second line of text 210 to include the words "on a" results in a reduced penalty value for the second line of text 210 (i.e., the second line of text 210 ends closer to the inset edge 120). Therefore, the line extension module 132 extends the second line of text 210 to include the words "on a." However, the line extension module 132 does not further extend the second line of text 210 to include the word "variable" because doing so would cause the second line of text 210 to extend past the overlap edge 130. This process is then repeated for the third line of text 212, and then for all additional lines of text wrapped around the digital object 110. In this way, the text wrap modification module 104 outputs and displays an optimal configuration for the lines of text 208, 210, 212 by utilizing the variable overlap 128.

Figure 3:
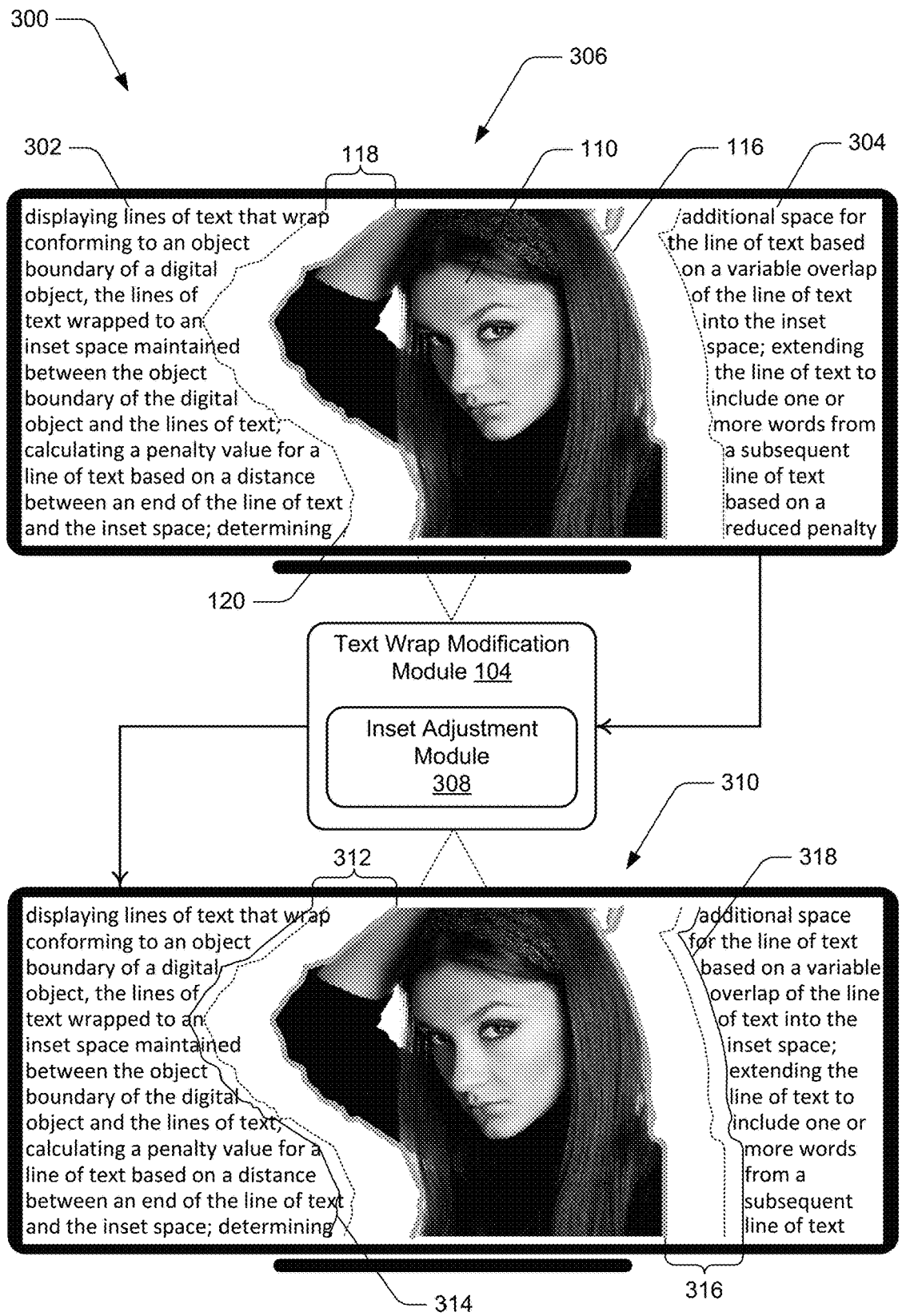
FIG. 3 further illustrates examples of text wrap modification using variable inset in accordance with one or more implementations.

FIG. 3 further illustrates examples 300 of text wrap modification using variable inset as implemented by the text wrap modification module 104 shown and described with reference to FIG. 1. In this example, a user of the computing device 102 provides text and the digital object 110 as input to the text editing user interface 106. However, in example 300, the digital object 110 is positioned in between two columns 302, 304 of wrapped text. As a result, the first column 302 of the wrapped text is displayed on a first side of the digital object 110 (e.g., on the left side of the digital object as viewed on the user interface), and the second column 304 of the wrapped text is displayed on second side of the digital object 110 (e.g., on the right side of the digital object as viewed on the user interface).

In accordance with this functionality, the text wrap modification module 104 causes the text editing user interface 106 to display lines of text that wrap conforming to an object boundary 116 of the digital object 110, while maintaining an inset space 118 between the object boundary 116 of the digital object 110 and the lines of text. Since the digital object 110 is positioned between two columns 302, 304 of text, the inset space 118 is maintained on either side of the digital object 110 between the two columns 302, 304 of text. Notably, example 306 depicts a first instance of the text editing user interface 106 after the text wrap modification module 104 determines and displays the optimal configuration for the lines of text in the first column 302 utilizing the variable overlap 128, as further described with reference to FIGS. 1 and 2. For example, the first column 302 includes at least some lines of text that extend into the inset space 118.

It should also be noted that the text wrap modification module 104 need not determine the optimal configuration for the lines of text included in the second column 304. This is because the text in example 300 has a flush left alignment and a ragged right alignment. As a result, the lines of text included in the second column 304 (i.e., the right-hand column) are aligned with the inset edge 120. In comparison, the lines of text included in the first column 302 (e.g., the left-hand column) are not aligned along the inset edge 120. Since the lines of text in the first column 302 are not aligned with the inset edge 120, the inset space 118 actually maintained between the lines of text in first column 302 and the object boundary 116 varies among the lines of text. In comparison, the inset space 118 actually maintained between the lines of text in the second column 304 and the object boundary 116 is consistent among the lines of text. Although the text of FIG. 3 is left-aligned, it should be appreciated that the text wrap modification module 104 is capable of performing techniques described herein for text wrap modification using variable inset with right-aligned text or full justified text as well.

Due to the inconsistent spacing between the object boundary 116 and the lines of text in the first column 302, the average inset space 118 actually maintained between the first column 302 of text and the object boundary 116 can be different than the inset space 118 actually maintained between the second column 304 of text and the object boundary 116. For example, a majority of the lines of text included in the first column 302 end short of the inset edge 120, while the lines of text included in the second column 304 begin at the inset edge 120. Accordingly, the digital object 110 can appear off-center with respect to the two columns 302 of wrapped text. This problem is further exacerbated through the use of a rigid, non-flexible inset space 118, as utilized by conventional text wrap approaches.

The text wrap modification module 104 can receive the lines of text as wrapped conforming to the object boundary 116 of the digital object 110, with the inset space 118 maintained between the object boundary 116 of the digital object 110 and the lines of text. The text wrap modification module 104 includes an inset adjustment module 308 configured to adjust the inset space 118 maintained between the second column 304 of text and the object boundary 116 based on an average of the inset space 118 maintained between the first column 302 of text and the object boundary 116. Notably, example 310 depicts a second instance of the text editing user interface 106 after the inset space 118 maintained between the second column 304 of text and the object boundary 116 is adjusted.

In implementations, the inset adjustment module 308 determines an average inset space 312 between the lines of text and a first side of the object boundary 116 of the digital object 110. The average inset space 312 is determined for one of the two columns 302, 304 that includes lines of text that are not aligned with the inset edge 120. Thus, in this example 310, the inset adjustment module 308 determines the average inset space 312 between the lines of text in the first column 302 and the object boundary 116 of the digital object 110. In general, the average inset space 312 is the overall average distance between the lines of text in the first column 302 and the object boundary 116.

The inset adjustment module 308 can determine the average inset space 312 in a variety of ways. In one example implementation, the inset adjustment module 308 determines the average inset space 312 based on a length from the end of each line of text in the first column 302 to the object boundary 116. In another example implementation, the inset adjustment module 308 determines the average inset space 312 based on a length from the end of each line of text in the first column 302 to the inset edge 120. In accordance with this example, the inset adjustment module 308 accounts for lines of text that extend past the inset edge 120. For instance, lines of text that do not extend past the inset edge 120 can be given a positive value for length, while lines of text that extend past the inset edge 120 can be given a negative value for length. Notably, an average inset edge 314 is depicted which follows the contours of the object boundary 116 and is extended from the digital object 110 by the average inset space 312. It should be noted that the average inset edge 314 is included in FIG. 3 for illustrative purposes, and the text editing user interface 106 can be displayed with or without the average inset edge 314.

Alternatively or additionally, the inset adjustment module 308 can determine the average inset space 312 based on penalty values previously calculated by the penalty calculation module 124. Notably, the penalty calculation module 124 can calculate the penalty values for the lines of wrapped text in the first column 302 when determining the optimal configuration for the lines of text in the first column 302. As mentioned above, the penalty value calculated for a line of text can be reflective of a distance between the end of the line of text and the inset edge 120. Accordingly, the penalty values for the lines of wrapped text in the first column 302 that were previously calculated by the penalty calculation module 124 can reflect a distance between the ends of the lines of wrapped text in the first column 302 and the inset edge 120. Thus, the inset adjustment module 308 can leverage the penalty values previously calculated for the lines of wrapped text in the first column 302 in determining the average inset space 312. Doing so leads to increased computational efficiency as it eliminates the need to re-calculate distance between the ends of the lines of wrapped text in the first column 302 and the inset edge 120.

The inset adjustment module 308 is further configured to generate an adjusted inset space 316 maintained between the lines of text and a second side of the object boundary 116 to the average inset space 312. As shown in example 310, the inset adjustment module 308 generates the adjusted inset space 316 between the lines of text in the second column 304 and the object boundary 116 of the digital object 110. The inset adjustment module 308 can set the adjusted inset space 316 to be equivalent to the average inset space 312 determined between the lines of text in the first column 302 and the object boundary 116 of the digital object 110.

Notably, an adjusted inset edge 318 is depicted which generally follows the contours of the object boundary 116 and is extended from the digital object 110 by the adjusted inset space 316. In accordance with this functionality, the inset adjustment module 308 aligns the lines of wrapped text in the second column 304 with the adjusted inset edge 318 rather than the inset edge 120. It should be noted that the adjusted inset edge 318 is included in FIG. 3 for illustrative purposes, and the text editing user interface 106 can be displayed with or without the adjusted inset edge 318.

As shown in example 310, the text wrap modification module 104 further causes the text editing user interface 106 to display the second column 304 of text that wraps conforming to the object boundary 116 of the digital object 110, while maintaining the adjusted inset space 316 between the object boundary 116 and the second column 304 of text. By adjusting the inset space for the second column 304 based on the average inset space 312 for the first column 302, the digital object 110 will appear more centered between the columns 302, 304 of text, as compared to conventional techniques.

Alternatively or additionally, the text wrap modification module 104 can balance the inset space 118 on each side of the digital object 110 by adjusting a positioning of the digital object 110 based on the average inset space 312. For example, the text wrap modification module 104 can adjust the positioning of the digital object 110 such that the digital object 110 is centered between the average inset edge 314 on the left side of the digital object 110 in the user interface and the inset edge (as shown in example 306) on the right side of the digital object 110 in the user interface. In some implementations, the text wrap modification module 104 can display a user-selectable prompt in response to displaying the wrapped lines of text in the first column 302, prompting the user to confirm balancing of the inset space 118. In response to a user input confirming the prompt, the text wrap modification module 104 can initiate to adjust the positioning of the digital object 110 and/or the inset adjustment module 308 can initiate to generate the adjusted inset space 316.

The inset adjustment module 308 can also initiate to generate the adjusted inset space 316 in response to receiving a selection of a user-selectable control. The user-selectable control, for instance, can be displayed in response to selecting the digital object 110 (e.g., with a double-click input, a right-click input, a tap and hold input, and the like), or selecting a tab displayed in the text editing user interface 106 to initiate display of a text wrap context menu. In some implementations, a single user-selectable control is selectable to cause the text wrap modification module 104 to output and display the optimal configuration for the lines of text in the first column 302 utilizing the variable overlap 128, as further described with reference to FIGS. 1 and 2, and also cause the text wrap modification module 104 to output and display the adjusted inset space 316. Alternatively or additionally, the text wrap modification module 104 can output and display the optimal configuration for the lines of text in the first column 302 utilizing the variable overlap 128 and also adjust the inset space for the second column 304 automatically as the text and the digital object 110 are provided as input. Regardless, the inset adjustment module 308 centers the digital object 110 between the two columns 302, 304 of text without the need to make manual adjustments to the inset space 118.

In implementations of text wrap modification using variable inset as described herein, the text wrap modification module 104 can receive user input to alter the lines of text and/or the digital object 110. For example, a user of the computing device 102 can delete or add text, change a font size of the text, change a font type of the text, alter the size or positioning of the digital object 110, and so on. In response, the inset adjustment module 308 can, automatically and without further user input, determine an adjusted average inset space 312 based on the modifications to the text and/or the digital object 110. The inset adjustment module 308 can further adjust the inset space maintained between the second column 304 of text and the object boundary 116 based on the adjusted average inset space 312. For example, the inset adjustment module 308 can modify the adjusted inset space 316 to be equivalent to the adjusted average inset space 312.

Notably, example 300 depicts the inset adjustment module 308 generating the adjusted inset space 316 after the text wrap modification module 104 determines the optimal configuration for the lines of text in the first column 302 utilizing the variable overlap 128, as further described with reference to FIGS. 1 and 2. However, it should also be noted that the inset adjustment module 308 is capable of generating the adjusted inset space 316 prior to the text wrap modification module 104 determining the optimal configuration for the lines of text in the first column 302. In other words, the inset adjustment module 308 can be implemented as a standalone module to generate the adjusted inset space 316 for text wrap generated in accordance with a simple text wrap approach.

In accordance with this functionality, the text wrap modification module 104 can receive a subsequent user input to initiate to extend the lines of text in the first column 302 based on the variable overlap 128, as further described with reference to FIGS. 1 and 2. In response, the inset adjustment module 308, automatically and without further user input, can determine an adjusted average inset space 312 based on the lines of text in the first column 302 being extended to include one or more words from subsequent lines of text. The inset adjustment module 308 can further adjust the inset space maintained between the second column 304 of text and the object boundary 116 based on the adjusted average. For example, the inset adjustment module 308 can modify the adjusted inset space 316 to be equivalent to the adjusted average inset space 312.

FIG. 4 illustrates an example mobile device 400, such as a mobile phone or smartphone, in which aspects of text wrap modification using variable inset can be implemented. The mobile device 400 can be implemented as any type of computing device, client device, mobile phone, tablet device, communication, entertainment, gaming, media playback, and/or other type of electronic or computing device. Additionally, the mobile device 400 may include any number and combination of different components as further described with reference to the example device shown in FIG. 9, such as memory 402 and a processor 404.

The memory 402 can be used to maintain digital objects 406 in an objects library 408. The digital objects 406, for instance, can be graphics, diagrams, digital images, animations, vector objects, raster images, and so on. In some instances, the digital objects 406 can include a digital image which is captured by a camera of the mobile device 400. The digital objects 406 can be associated with object boundaries 410 which are outlines or borders of the digital objects 406. In one example, the object boundaries 410 can be contained in metadata of the digital objects 406. Alternatively or additionally, the object boundaries 410 can be defined manually by a user using an application of the mobile device, such as the text wrap modification module 104. The text wrap modification module 104 can also be configured to extract the object boundaries 410 automatically, for example, using a boundary extraction technique (e.g., spatial filtering) of a digital image.

The mobile device 400 implements the text wrap modification module 104, such as in software, in hardware, or as a combination of software and hardware components. The text wrap modification module 104 can be implemented as a software application or module, such as executable software instructions (e.g., computer-executable instructions) that are executable with a processing system (e.g., the processor 404) of the mobile device 400 to implement the techniques of text wrap modification using variable inset. The text wrap modification module 104 can be stored on computer-readable storage media, such as any suitable memory device (e.g., the device memory 402) or other electronic data storage implemented in the mobile device 400. Additionally, the text wrap modification module 104 includes the penalty calculation module 124, the space determination module 126, the line extension module 132, and the inset adjustment module 308, each of which may be implemented as an independent or integrated module of the text wrap modification module 104. Further, although the modules and/or models described herein for text wrap modification using variable inset are described with certain functionality, other combinations and sub-combinations of elements, functions, and features are contemplated.

In this example, the mobile device 400 includes applications 412, such as applications that have been downloaded to the mobile device 400, and the text wrap modification module 104 can be implemented as a module or software component of one or more of the device applications 412. In implementations, one or more of the device applications 412 may implement features or functions that provide for graphic design, publication development, document design, artistic creations, and the like. In aspects of text wrap modification using variable inset, the user of the mobile device 400 can provide lines of text 414 and a digital object 406 as input via a user interface 416 of a device application 412. The device application 412 can apply a simple text wrap approach to the digital object 406 and the lines of text 414, which causes the user interface 416 to display the lines of text 414 that wrap conforming to an object boundary 410 of the digital object 406, while maintaining an inset space 418 between the object boundary 410 and the lines of text 414. In implementations, the device application 412 can initiate to apply the simple text wrap approach automatically as the digital object 406 and the lines of text 414 are provided as input. The device application 412 can also initiate to apply the simple text wrap approach in response to receiving an additional user input via the user interface 416. Notably, example 112 of FIG. 1 depicts an example of the simple text wrap approach.

The digital object 406, the lines of text 414, and the inset space 418 as displayed in the user interface 416 after applying the simple text wrap approach can be provided as input to the text wrap modification module 104. For example, the digital object 406, the lines of text 414, and the inset space 418 can be provided to the text wrap modification module 104 automatically as the lines of text 414 and the digital object 406 are provided as input, or in response to an additional user input via the user interface 416.

The penalty calculation module 124 of the text wrap modification module 104 can be implemented in the mobile device 400 to calculate penalty values 420 for the lines of text 414 using a penalty function. The penalty value 420 represents a measure of deviation from optimal text conditions for a line of text 414. In implementations, the optimal text conditions can include an optimal inset space, which can be the inset space 418 maintained between the object boundary 410 and the lines of text 414. Thus, the penalty value 420 is based, in part, on a distance between an end of a line of text 414 and the inset space 418.

The space determination module 126 of the text wrap modification module 104 can be implemented in the mobile device 400 to determine an additional space 422 available for a line of text 414 based on a variable overlap 424 into the inset space 418. As mentioned above, the variable overlap 424 represents a portion of the inset space 418 into which the lines of text 414 are permitted to overlap. Notably, the additional space 422 available for the line of text is between the end of the line of text 414 and into the variable overlap 424 of the inset space 418.

The line extension module 132 of the text wrap modification module 104 can be implemented in the mobile device 400 to iteratively extend the lines of text 414 to include one or more words 426 from a subsequent line of text 428. To do so, the line extension module 132 can leverage the penalty calculation module 124 to determine whether extending a line of text 414 to include the one or more words 426 from the subsequent line of text 428 results in a reduced penalty value 420 for the line of text 414. The line extension module 132 can also leverage the space determination module 126 to determine whether the one or more words 426 from the subsequent line of text 428 fit within the additional space 422 available for the line of text 414. In accordance with this functionality, the line extension module 132 can extend the line of text 414 to include the one or more words 426 from the subsequent line of text 428 if the line of text 414 as extended to include the one or more words 426 from the subsequent line of text 428 is associated with the reduced penalty value 420 and fits within the additional space 422 available for the line of text 414. In doing so, the line extension module 132 generates a modified line of text 430.

The line extension module 132 can then iteratively repeat this process until all lines of text 414 wrapped around the digital object 110 are extended in accordance with techniques implemented by the text wrap modification module 104, as described herein. For example, after extending a first line of text to include one or more words from a second line of text, the line extension module 132 evaluates whether the second line of text can be extended to include one or more words based on the penalty value 420 and the additional space 422 for the second line of text. It should be noted that the line extension module 132 evaluates the second line of text as modified to no longer include the one or more words that were incorporated into the first line of text. Next, the line extension module 132 can evaluate the third line of text, then a fourth line of text, and so on.

Thus, the line extension module 132 generates modified lines of text 430, which can be output for display in the user interface 416 of the device application 412. By utilizing the variable overlap 424 into the inset space 418, the text wrap modification module 104 creates a text wrap with more consistent and aesthetically pleasing spacing between the modified lines of text 430 and the digital object 406, as compared to conventional techniques.

In implementations, the digital object 406 can be positioned in between two columns of wrapped text. Due to flush-ragged alignment of the lines of text 414, the digital object 406 can appear off-center with respect to the two columns of wrapped text, as further discussed above in relation to FIG. 3. In accordance with these implementations, the inset adjustment module 308 of the text wrap modification module 104 can be implemented in the mobile device 400 to adjust the inset space 418 maintained between the lines of text 414 and a second side of the digital object 406 based on an average inset space 432 maintained between the lines of text 414 and a first side of the digital object 406.

In accordance with this functionality, the inset adjustment module 308 can determine an average inset space 432 maintained between the lines of text 414 and a first side of the object boundary 410 of the digital object 406. For example, the inset adjustment module 308 can determine the average inset space 432 maintained between a first column of text (e.g., displayed on a first side of the digital object 406) and the object boundary 410. The average inset space 432 determined by the inset adjustment module 308 represents the average distance between the lines of text 414 in the first column and the first side of the object boundary 410. In implementations, the first column of text can correspond to the modified lines of text 430 generated and output by the line extension module 132. As such, the inset adjustment module can determine the average inset space 432 for the modified lines of text 430.

The inset adjustment module 308 can also adjust a width of the inset space 418 between the lines of text 414 and a second side of the object boundary 410 to the average inset space 432. For example, the inset adjustment module 308 can generate and output an adjusted inset space 434 to be maintained between a second column of text (e.g., displayed on the second side of the digital object 406) and the object boundary 410. Notably, the inset adjustment module 308 sets the adjusted inset space 434 to be equal to the average inset space 432, causing the digital object 406 to be centered between the columns of text displayed on either side of the digital object 406. The adjusted inset space 434 can then be displayed in the user interface 416 of the device application 412 along with the modified lines of text 430.

Figure 5:
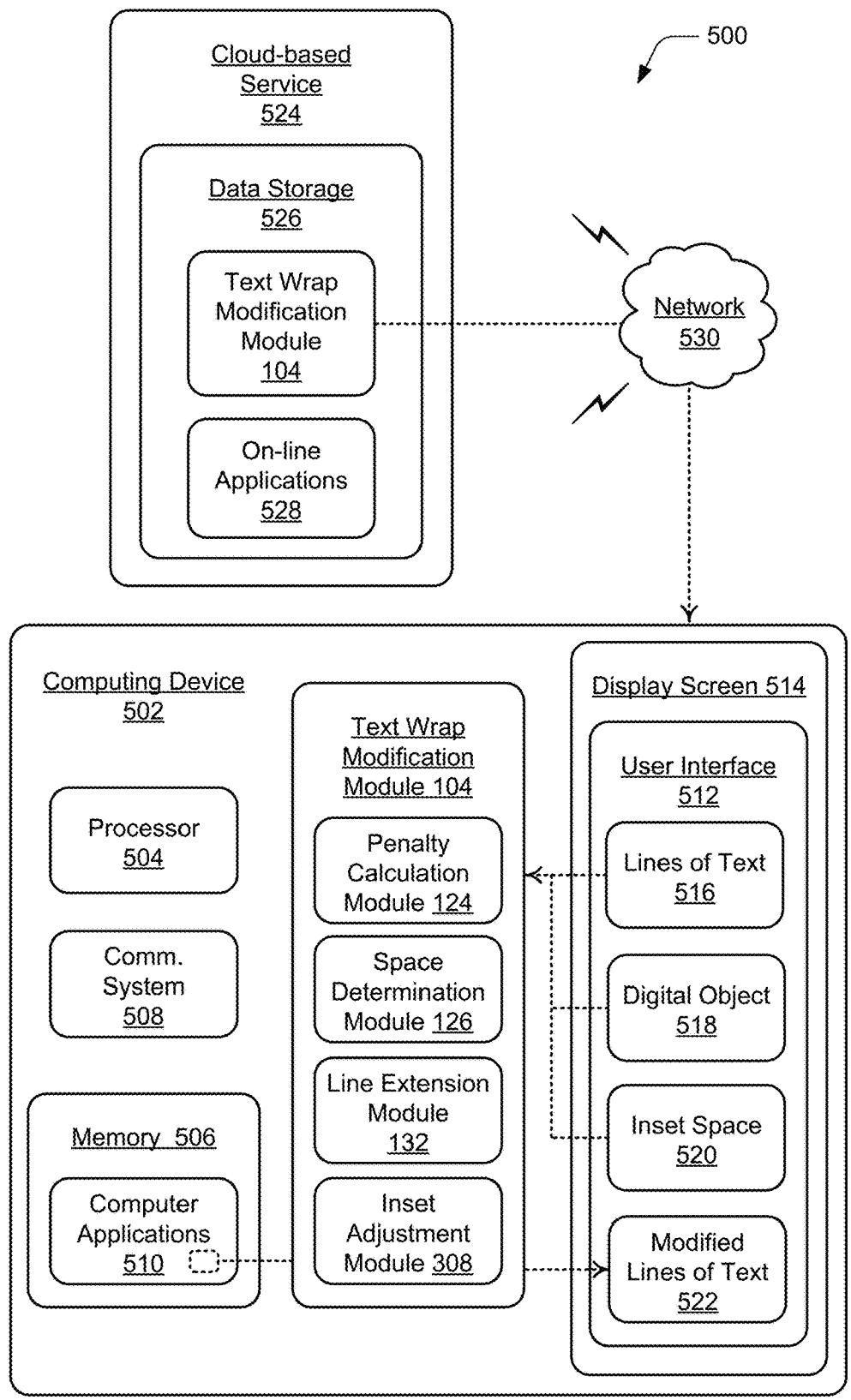
FIG. 5 illustrates an example environment in which aspects of text wrap modification using variable inset can be implemented.

FIG. 5 illustrates an example environment 500 in which aspects of text wrap modification using variable inset can be implemented. The example environment 500 includes a computing device 502, such as the computing device 102 shown in FIGS. 1-3, the mobile device 400 shown in FIG. 4, or any other type of a mobile phone, media playback, computing, communication, gaming, entertainment, portable electronic media device, or computer device. The computing device 502 can be implemented with various components, such as processor 504 (or processing system) and memory 506, and with any number and combination of differing components as further described with reference to the example device shown in FIG. 9. Although not shown, the computing device 502 can include a power source, such as a battery, to power the various device components. Further, the computing device 502 can include different wireless radio systems, such as for Wi-Fi, Bluetooth™, Mobile Broadband, LTE, or any other wireless communication system or format. Generally, the computing device 502 implements a communication system 508 that includes a radio device, antenna, and chipset that is implemented for wireless communication with other devices, networks, and services.

The computing device 502 includes one or more computer applications 510, any of which may generate a user interface 512 for display on a display screen 514 of the computing device 502. As noted above, the computer applications 510 can include many different types of computer applications that implement features or functions that provide for graphic design, publication development, document design, artistic creations, and the like. Any of the different types of computer applications 510 can include the text wrap modification module 104 that implements embodiments of text wrap modification using variable inset, as illustrated and described above with reference to FIGS. 1-4.

The text wrap modification module 104 includes the penalty calculation module 124, the space determination module 126, the line extension module 132, and the inset adjustment module 308, each of which may implemented as an independent or integrated module of the text wrap modification module 104. The text wrap modification module 104 can be implemented on the computing device 502 as a software application or module, such as computer-executable instructions that are executable with the processor 504 (or with a processing system) to implement embodiments described herein. The text wrap modification module 104 can be stored on computer-readable storage memory (e.g., the device memory 506), such as any suitable memory device or electronic data storage implemented in the computing device 502. Although shown as a separate module or component, the text wrap modification module 104 may be integrated as a module or component with any of the computer applications 510 in implementations of text wrap modification using variable inset.

As described above, a user of the computing device 502 can provide lines of text 516 and a digital object 518 as input to a computer application 510 (e.g., a computer application 510 that implements the text wrap modification module 104). The computer application 510 can apply a simple text wrap approach to the lines of text 516 and the digital object 518, which causes the user interface 512 to display the lines of text 516 that wrap conforming to an object boundary of the digital object 518, while maintaining an inset space 520 between the object boundary of the digital object 518 and the lines of text 516. Notably, example 112 of FIG. 1 depicts an example of the simple text wrap approach.

The text wrap modification module 104 can receive the lines of text 516, digital object 518, and inset space 520, as displayed in the user interface 512 after the simple text wrap approach is applied. The line extension module 132 can iteratively extend the lines of text 516 based on penalty values calculated for the lines of text 516 by the penalty calculation module 124, and an additional space available for the lines of text 516 accounting for a variable overlap, as determined by the space determination module 126. The inset adjustment module 308 can then adjust the inset space 520 maintained on a second side of the digital object 518 based on an average inset space maintained on a first side of the digital object 518. The text wrap modification module 104 can then output modified lines of text 522, which includes the lines of text 516 as extended by the line extension module 132, and the inset space 520 as adjusted by the inset adjustment module 308. The modified lines of text 522 can then be displayed on the display screen 514 of the computing device 502 via the user interface 512.

The example environment 500 also includes a cloud-based service 524, such as Adobe Creative Cloud® that is accessible by client devices, to include the computing device 502, the device 102, and the mobile device 400. The cloud-based service 524 includes data storage 526 that may be implemented as any suitable memory, memory device, or electronic data storage for network-based data storage. The data storage can maintain an instance or instantiation of the text wrap modification module 104, as well as on-line applications 528 (e.g., as network-based applications), that are accessible by a computer application 510 from the computing device 502. Examples of the on-line applications 528 include Adobe Photoshop® and Adobe InDesign® for publication design, Adobe InCopy® for general word processing, and Adobe Illustrator® for vector graphics editing.

The cloud-based service 524 can also be implemented with server devices that are representative of one or multiple hardware server devices of the service. Further, the cloud-based service 524 can be implemented with various components, such as a processing system and memory, as well as with any number and combination of differing components as further described with reference to the example device shown in FIG. 9 to implement the services, applications, servers, and other features of text wrap modification using variable inset.

The example environment 500 also includes a network 530, and any of the devices, servers, and/or services described herein can communicate via the network, such as for data communication between the computing device 502 and the cloud-based service 524. The network 530 can be implemented to include a wired and/or a wireless network. The network 530 can also be implemented using any type of network topology and/or communication protocol, and can be represented or otherwise implemented as a combination of two or more networks, to include IP-based networks and/or the Internet. The network 530 can also include mobile operator networks that are managed by a network operator and/or other network operators, such as a communication service provider, mobile phone provider, and/or Internet service provider.

Example methods 600, 700, and 800 are described with reference to respective FIGS. 6, 7, and 8 in accordance with one or more aspects of text wrap modification using variable inset. Generally, any of the components, modules, methods, and operations described herein can be implemented using software, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 6:
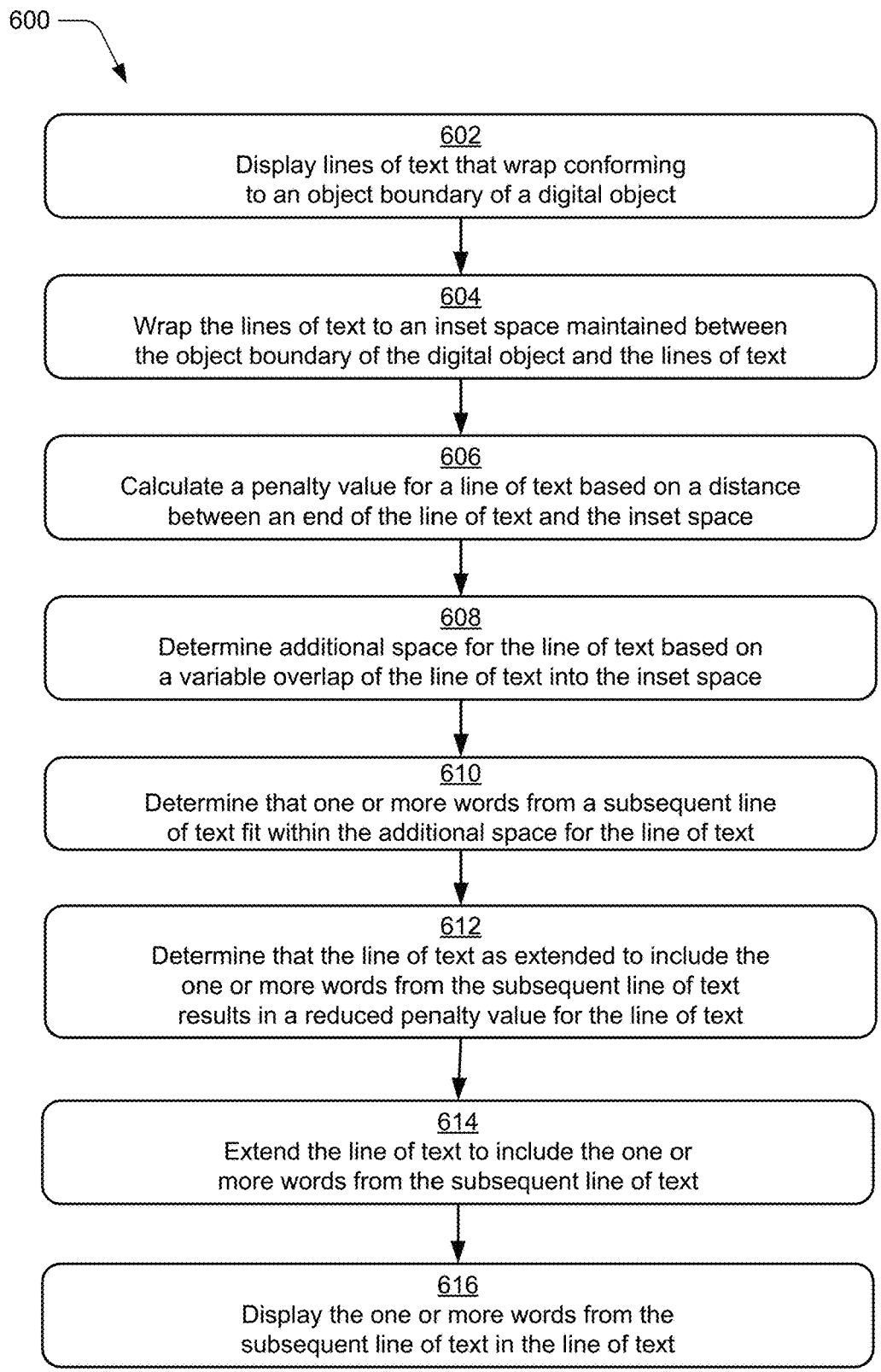
FIG. 6 illustrates an example method of text wrap modification using variable inset in accordance with one or more implementations.

FIG. 6 illustrates example method(s) 600 of text wrap modification using variable inset, and is generally described with reference to the text wrap modification module as shown and described with reference to FIGS. 1-5. The order in which the method is described is not intended to be construed as a limitation, and any number or combination of the method operations can be combined in any order to implement a method, or an alternate method.

At 602, lines of text are displayed that wrap conforming to an object boundary of a digital object. For example, a user of the computing device 102 can provide lines of text 108 and the digital object 110 as input to the text editing user interface 106. The device application 412 can then perform a simple text wrap approach, causing the text editing user interface 106 to display the lines of text 108 surrounding the digital object 110 without the lines of text 108 and the object boundary 116 of the digital object 110 overlapping.

At 604, the lines of text are wrapped to an inset space maintained between the object boundary of the digital object and the lines of text. For example, in performing the simple text wrap approach, the device application 412 causes the text editing user interface 106 to display the lines of text 108 that wrap conforming to the object boundary 116 of the digital object 110, while maintaining the inset space 118 between the object boundary 116 of the digital object 110 and the lines of text 108. The inset space 118 represents a predefined amount of space to be maintained between the digital object 110 and the lines of text 108. Notably, example 112 of FIG. 1 depicts an example of the simple text wrap approach.

At 606, a penalty value is calculated for a line of text based on a distance between an end of the line of text and the inset space. For example, the penalty calculation module 124 calculates a penalty value for a line of text 108 based on a distance between the end of the line of text 108 and the inset space 118. As noted above, the penalty value is a measure of deviation from optimal text conditions, such that a higher penalty value represents a higher deviation from the optimal text conditions. The optimal text conditions can define an optimal inset space for the lines of text 108, such as inset space 118. Accordingly, the penalty value calculated for the line of text 108 can represent a distance from the end of the line of text 108 to the inset edge 120. In accordance with this functionality, the line of text 108 has a higher penalty value if the end of the line of text 108 is further from the inset edge 120. In implementations, the penalty value can also be based on other optimal text conditions, such as an optimal spacing between words of the line of text 108, and an optimal glyph width of the individual glyphs in the line of text 108, as further described above with reference to FIG. 2.

At 608, an additional space for the line of text is determined based on a variable overlap of the line of text into the inset space. For example, the space determination module 126 determines the additional space, such as additional space 214a, 214b, 214c, for the line of text 108 based on the variable overlap 128 into the inset space 118. The variable overlap 128 defines a portion of the inset space 118 into which the lines of text 108 are permitted to overlap. In accordance with this functionality, the additional space available for the line of text 108 is between the end of the line of text 108 and into the variable overlap 128 into the inset space 118. For instance, the space determination module 126 determines the additional space available for the line of text 108 to be the space from the end of the line of text 108 to the overlap edge 130.

In implementations, the text wrap modification module 104 can receive user input specifying an amount of the inset space 118 and the variable overlap 128 into the inset space 118. For example, the text wrap modification module 104 can display user-selectable controls in the text editing user interface 106 that are offered as advanced user options to independently adjust the variable overlap 128 and the inset space 118.

At 610, one or more words from a subsequent line of text are determined to fit within the additional space for the line of text. For example, the line extension module 132 identifies one or more words that are being pushed from the end of the line of text 108 to a subsequent line of text. The line extension module 132 can determine a length of the one or more words from the subsequent line of text based on, for example, a font type, a font size, a number of glyphs in the one or more words, and/or a glyph width of the individual glyphs included in the one or more words. The one or more words are determined to fit within the additional space for the line of text 108 based on the length of the one or more words being less than the additional space determined for the line of text 108 based on the variable overlap 128.

At 612, the line of text as extended to include the one or more words from the subsequent line of text is determined to result in a reduced penalty value for the line of text. For example, the penalty calculation module 124 calculates the penalty value for the line of text 108 without the one or more words from the subsequent line of text included in the line of text 108 (e.g., at block 606). The penalty calculation module 124 also calculates the penalty value for the line of text 108 as extended to include the one or more words from the subsequent line of text. The line extension module 132 can then compare the penalty values and determine that the line of text 108 as extended to include the one or more words from the subsequent line of text has a lower penalty value than the unmodified line of text 108.

At 614, the line of text is extended to include the one or more words from the subsequent line of text. For example, the line extension module 132 removes the one or more words from the subsequent line of text and incorporates the one or more words to the end of the line of text 108, resulting in an extended version of the line of text 108. At 616, the one or more words from the subsequent line of text are displayed in the line of text 108. For example, the text wrap modification module 104 causes display of the extended version of the line of text 108 in the text editing user interface 106.

Notably, in extending the line of text 108, the line extension module 132 can iteratively include a next word from the subsequent line of text resulting in the reduced penalty value and the next iterative word fitting within the additional space for the line of text 108, as further discussed below with reference to FIG. 7. For example, the line extension module 132 identifies a next word from the subsequent line of text and determines that the next word fits within the additional space available for the line of text 108 (block 610), determines that the line of text 108 as extended to include the next word from the subsequent line of text results in the reduced penalty value for the line of text (block 612), and extends the line of text 108 to include the next word from the subsequent line of text (block 614). The line extension module 132 can then repeat block 610, 612, and 614 for the next iterative word included in the subsequent line of text. This process is repeated until extending the line of text 108 to include the next iterative word does not result in the reduced penalty value, or the next iterative word does not fit within the additional space for the line of text 108.

Furthermore, the line extension module 132 can iteratively calculate the penalty value (block 606), determine the additional space (block 608), determine that the one or words fit within the additional space (block 610), determine that the extended version of the line of text 108 results in the reduced penalty value (block 612), and extend the line of text 108 (block 614) for each additional line of text 108 wrapped around the digital object 110, as further discussed below with reference to FIG. 7. The additional lines of text 108 can then be displayed in the text editing user interface 106 as extended to include the one or more words from the subsequent lines of text. In doing so, the text editing user interface 106 determines and displays the optimal configuration for the lines of text 108 given the variable overlap 128.

The text wrap modification module 104 can also receive a subsequent user input to alter a line of text 108 after the optimal configuration for the lines of text 108 is displayed in the user interface 106. In response to receiving the subsequent user input, the text wrap modification module 104 can initiate to iteratively extend the altered line of text 108 and subsequent lines of text 108 wrapped around the digital object 110 in accordance with techniques described herein. For example, the text wrap modification module 104 can iteratively calculate the penalty value (block 606), determine the additional space (block 608), determine that the one or words fit within the additional space (block 610), determine that the extended version of the line of text 108 results in the reduced penalty value (block 612), and extend the line of text 108 (block 614) for the altered line of text 108 and each line of text 108 subsequent to the altered line of text 108. In implementations, the text wrap modification module 104 can modify the text wrap for the altered line of text 108 and the subsequent line of text 108 automatically in response to receiving the subsequent user input to alter the line of text 108 (i.e., without a further user input).

Figure 7:
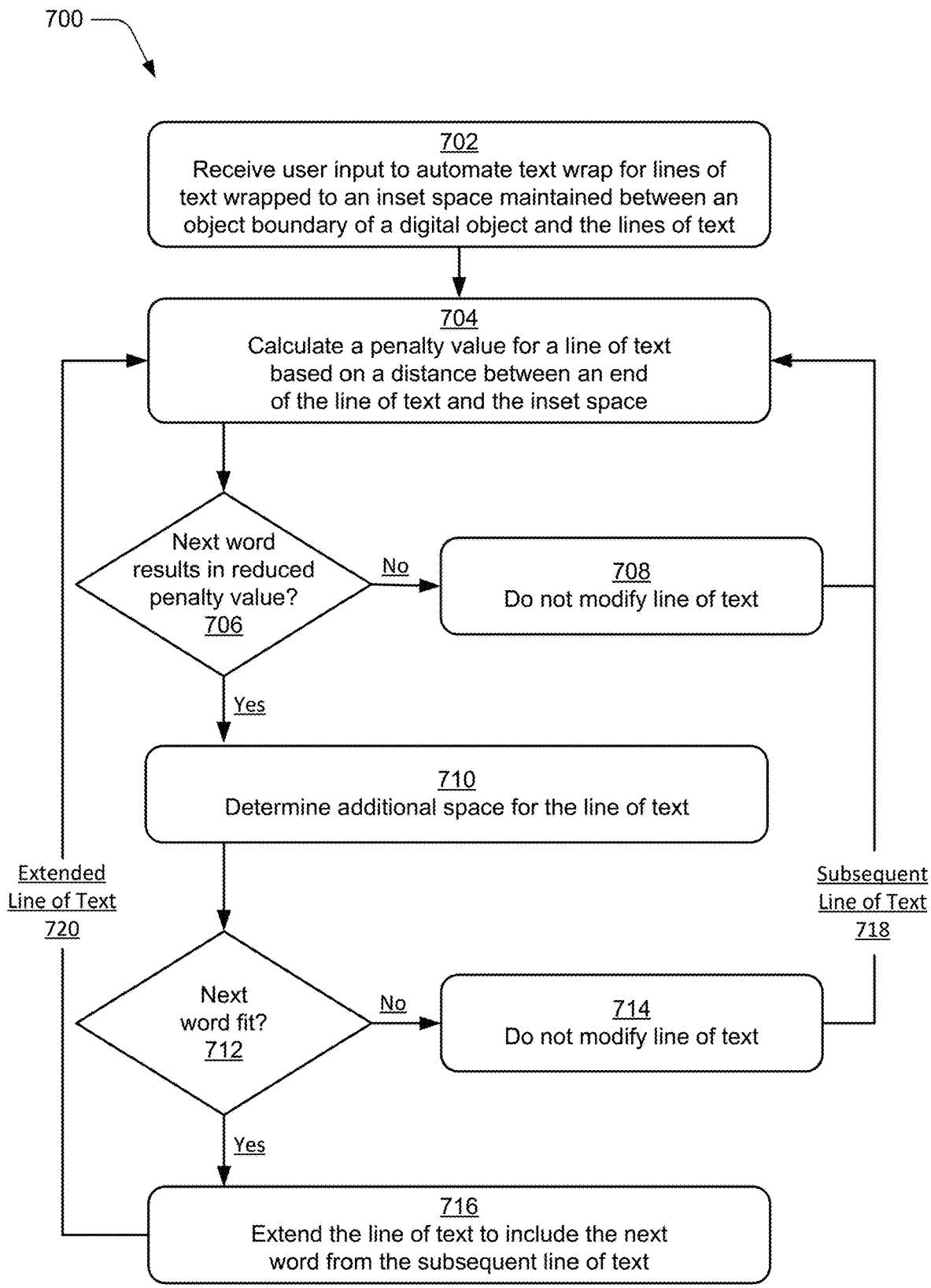
FIG. 7 illustrates an example method of a text wrap modification module determining how to modify text wrap in accordance with one or more implementations of text wrap modification using variable inset.

FIG. 7 illustrates example method(s) 700 of text wrap modification using variable inset, and is generally described with reference to the text wrap modification module to determine how to modify text wrap as shown and described with reference to FIGS. 1-5. The order in which the method is described is not intended to be construed as a limitation, and any number or combination of the method operations can be combined in any order to implement a method, or an alternate method.

At 702, a user input is received to automate text wrap for lines of text wrapped to an inset space maintained between an object boundary of a digital object and the lines of text. For example, the text editing user interface 106 can display the lines of text 108 wrapped conforming to the object boundary 116 of the digital object 110, while maintaining the inset space 118 between the object boundary 116 and the lines of text 108. The text wrap modification module 104 can then receive a user input via a user-selectable control to initiate extending the lines of text 108 in accordance with techniques described herein for text wrap modification using variable inset. The user-selectable control, for instance, can be displayed in response to selecting the digital object 110 (e.g., with a double-click input, a right-click input, a tap and hold input, a drag-n-drop input, and the like), or selecting a tab displayed in the text editing user interface 106 to initiate display of a text wrap context menu. Alternatively or additionally, the text wrap modification module 104 can initiate to extend the lines of text 108 automatically as the text 108 and the digital object 110 are provided as input.

At 704, a penalty value is calculated for a line of text based on a distance between an end of the line of text and the inset space. For example, the penalty calculation module 124 calculates the penalty value for the line of text 108 based on a distance between the end of the line of text 108 and the inset edge 120.

At 706, a determination is made as to whether extending the line of text to include a next word from a subsequent line of text results in a reduced penalty value for the line of text. For example, the penalty calculation module 124 calculates the penalty value for the line of text 108 as extended to include a next iterative word from a subsequent line of text 718. The line extension module 132 can then compare the penalty values to determine whether the penalty value for the line of text 108 as extended to include the next iterative word is less than the unmodified line of text 108.

If extension of the line of text 108 to include the next word from the subsequent line of text 718 does not result in the reduced penalty value for the line of text 108 (i.e., "No" from 706), then at 708, the line of text is not modified. For example, the line extension module 132 does not modify the line of text 108 to include the next word from the subsequent line of text 718. Further, the method continues at 704 to evaluate whether extension of the subsequent line of text 718 is appropriate in accordance with techniques described herein for text wrap modification using variable inset. For example, the method begins again at 704 with the penalty calculation module 124 calculating a penalty value for the subsequent line of text 718 based on a distance between an end of the subsequent line of text 718 and the inset edge 120.

If extension of the line of text 108 to include the next word from the subsequent line of text does result in the reduced penalty value for the line of text 108 (i.e., "Yes" from 706), then at 710, additional space is determined for the line of text. For example, the space determination module 126 determines an additional space, such as the additional space 214a, 214b, 214c, available for the line of text 108 based on the variable overlap 128. The additional space, for instance, is the space between the end of the line of text 108 and into the variable overlap 128 of the inset space 118.

At 712, a determination is made as to whether the next word from the subsequent line of text fits within the additional space for the line of text. For example, the line extension module 132 determines a length of the next word from the subsequent line of text 718 based on, for example, font size, font type, spacing between words, and/or glyph width. The next word is determined to fit in the line of text 108 if the determined length of the next word is less than the additional space available for the line of text 108.

If the next word does not fit within the additional space for the line of text (i.e. "No" from 712), then at 714, the line of text is not modified. For example, the line extension module 132 does not modify the line of text 108 to include the next word from the subsequent line of text 718. Further, the method continues at 704 to evaluate whether extension of the subsequent line of text 718 is appropriate in accordance with techniques described herein for text wrap modification using variable inset. For example, the method begins again at 704 with the penalty calculation module 124 calculating a penalty value for the subsequent line of text 718 based on a distance between an end of the subsequent line of text 718 and the inset edge 120.

If the next word does fit within the additional space for the line of text (i.e., "Yes" from 712), then at 716, the line of text is extended to include the next word from the subsequent line of text. For example, the line extension module 132 extends the line of text 108 to include the next word from the subsequent line of text 718. In doing so, the line extension module 132 generates an extended line of text 720. Further, the method continues at 704 to evaluate whether further extension of the extended line of text 720 to also include an additional, next iterative word from the subsequent line of text 718 is appropriate in accordance with techniques described herein for text wrap modification using variable inset. For example, the method begins again at 704 with the penalty calculation module 124 calculating a penalty value for the extended line of text 720 based on a distance between an end of the extended line of text 720 and the inset edge 120.

Figure 8:
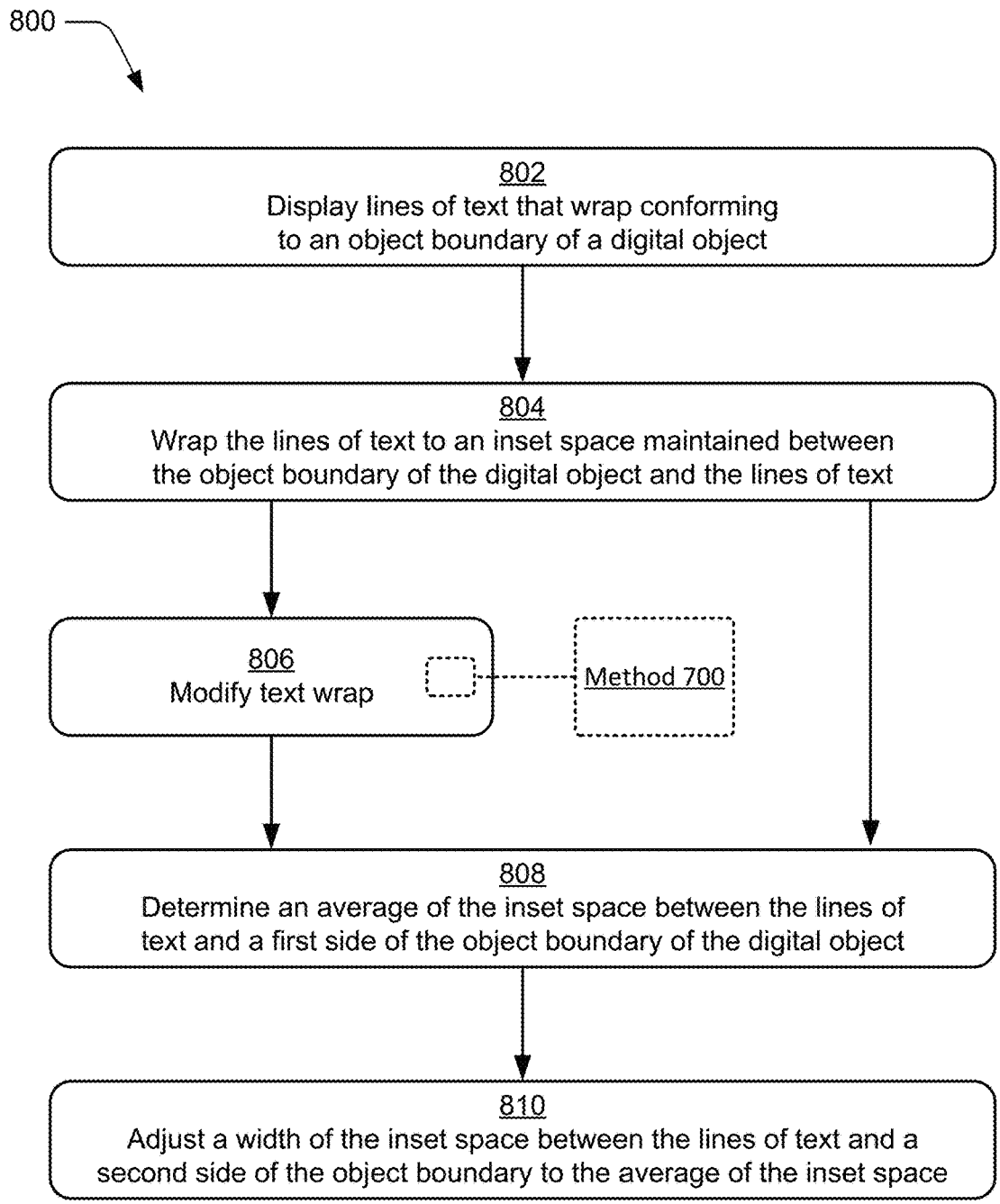
FIG. 8 illustrates an example method for modifying an inset space to create symmetrical text wrap in accordance with one or more implementations of text wrap modifications using variable inset.

FIG. 8 illustrates an example method(s) 800 of text wrap modification using variable inset, and is generally described with reference to the text wrap modification module to create symmetrical text wrap, as shown and described with reference to FIGS. 1-5. The order in which the method is described is not intended to be construed as a limitation, and any number or combination of the method operations can be combined in any order to implement a method, or an alternate method.

At 802, lines of text are displayed that wrap conforming to an object boundary of a digital object. For example, a user of the computing device 102 can provide lines of text 108 and the digital object 110 as input to the text editing user interface 106. The device application 412 can then perform a simple text wrap approach, causing the text editing user interface 106 to display the lines of text 108 surrounding the digital object 110 without the lines of text 108 and the object boundary 116 of the digital object 110 overlapping. In implementations, the digital object 110 can be positioned in between the two columns 302, 304 of wrapped text.

At 804, the lines of text are wrapped to an inset space maintained between the object boundary of the digital object and the lines of text. For example, in performing the simple text wrap approach, the device application 412 causes the text editing user interface 106 to display the lines of text 108 that wrap conforming to the object boundary 116 of the digital object 110, while maintaining the inset space 118 between the object boundary 116 of the digital object 110 and the lines of text 108. Since the digital object 110 is positioned between the two columns 302, 304 of text, the inset space 118 is maintained on either side of the digital object 110 between the two columns 302, 304 of text, as shown in example 306 of FIG. 3.

At 806, the text wrap is modified in accordance with method 700. For example, the text wrap modification module 104 can iteratively extend the lines of text in the first column 302 of text in accordance with method 700 of FIG. 7 to output and display the optimal configuration for the lines of text in the first column 302.

At 808, an average of the inset space is determined between the lines of text and a first side of the object boundary of the digital object. For example, the inset adjustment module 308 determines the average inset space 312 between the lines of text in the first column 302 and a first side of the object boundary 116. As previously discussed, the average inset space 312 represents the overall average distance between the lines of text in the first column 302 and the first side of the object boundary 116. By way of example, the inset adjustment module 308 can determine the average inset space 312 based on a distance determined between each line of text in the first column 302 and the inset edge 120.

In some embodiments, the method performs block 806 before progressing to block 808. In such embodiments, the inset adjustment module 308 can determine the average inset space 312 for the lines of text in the first column 302 as extended by the line extension module 132 in accordance with techniques for text wrap modification using variable inset, as described herein.

In some embodiments, the method skips block 806 and progresses straight to block 808. In such embodiments, the inset adjustment module 308 can determine the average inset space 312 for the lines of text in the first column 302 prior to the text wrap modification module 104 determining the optimal configuration for the lines of text in the first column 302. In other words, the inset adjustment module 308 can determine the average inset space 312 for the lines of text in the first column 302 wrapped in accordance with a simple text wrap approach.

At 810, a width of the inset space between the lines of text and a second side of the object boundary is adjusted to the average of the inset space. For example, the inset adjustment module 308 can adjust a width of the inset space 118 maintained between the second column 304 of text and a second side of the object boundary 116. In doing so, the inset adjustment module 308 generates the adjusted inset space 316. Notably, the inset adjustment module 308 can set the adjusted inset space 316 to be equal to the average inset space 312 determined between the lines of text in the first column 302 and the object boundary 116 of the digital object 110. The text wrap modification module 104 can further cause the text editing user interface 106 to display the second column 304 of text that wraps conforming to the object boundary 116 of the digital object 110, while maintaining the adjusted inset space 316 between the object boundary 116 and the second column 304 of text. By setting the adjusted inset space 316 to be equal to the average inset space 312, the digital object 110 will appear more centered between the columns 302, 304 of text, as compared to conventional techniques.

In implementations, the text wrap modification module 104 can receive a subsequent user input to modify the lines of text in the first column 302. For example, the text wrap modification module 104 can generate the adjusted inset space 316 for lines of text wrapped in accordance with a simple text wrap approach (i.e., without performing block 806). In accordance with this functionality, the text wrap modification module 104 can receive a subsequent user input to iteratively extend the lines of text in the first column 302 in accordance with techniques for text wrap modification using variable inset, as described herein. Additionally or alternatively, the text wrap modification module 104 can receive a subsequent user input to delete or add text, change a font size of the text, change a font type of the text, alter the size or positioning of the digital object 110, and so on. The text wrap modification module 104 can also receive a subsequent user input adjusting an amount of the inset space 118 and/or the variable overlap 128 into the inset space 118.

In accordance with this functionality, the inset adjustment module 308 can determine an adjusted average inset space 312 for the lines of text in the first column 302 as modified by the subsequent user input. The inset adjustment module 308 can further adjust the inset space maintained between the second column 304 of text and the object boundary 116 based on the adjusted average inset space 312. For example, the inset adjustment module 308 can modify the adjusted inset space 316 to be equivalent to the adjusted average inset space 312.

Figure 9:
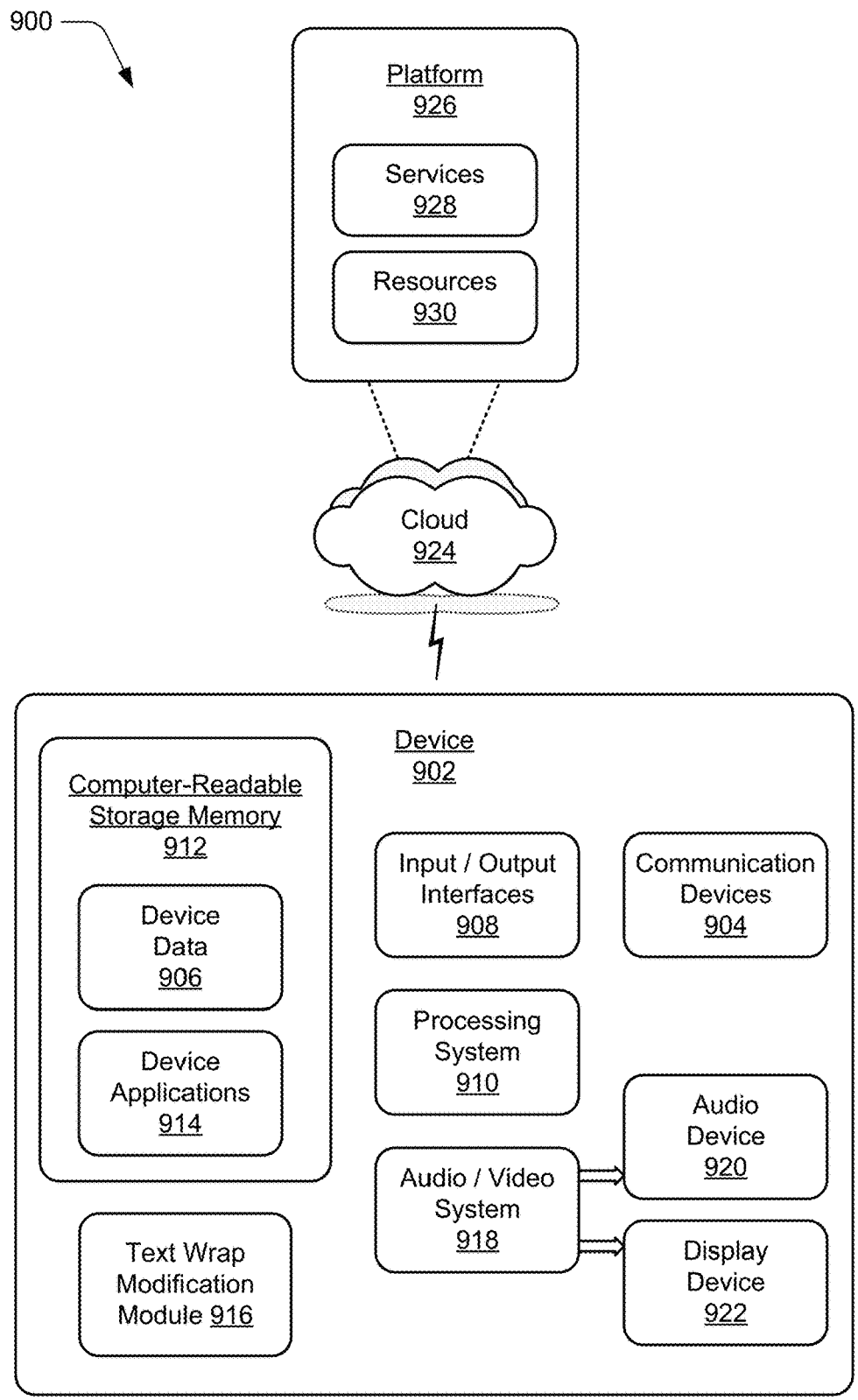
FIG. 9 illustrates an example system with an example device that can implement aspects of text wrap modification using variable inset.

FIG. 9 illustrates an example system 900 that includes an example device 902, which can implement techniques of text wrap modification using variable inset. The example device 902 can be implemented as any of the computing devices, mobile devices, server devices, and/or services described with reference to the previous FIGS. 1-8, such as any type of computing device, client device, mobile phone, tablet, communication, entertainment, gaming, media playback, and/or other type of device. For example, the device 102, the mobile device 400, and the computing device 502 may be implemented as the example device 902.

The example device 902 includes communication devices 904 that enable wired and/or wireless communication of device data 906, such as the digital object 110 and text 108, as well as computer applications data and content that is transferred from one computing device to another, and/or synched between multiple computing devices. The device data 906 can include any type of audio, video, image, and/or graphic data that is generated by applications executing on the device. The communication devices 904 can also include transceivers for cellular phone communication and/or for network data communication.

The device 902 also includes input/output (I/O) interfaces 908, such as data network interfaces that provide connection and/or communication links between the device, data networks, and other devices. The I/O interfaces can be used to couple the device to any type of components, peripherals, and/or accessory devices, such as a display device and/or computer input device that may be integrated with the example device 902. The I/O interfaces also include data input ports via which any type of data, media content, and/or inputs can be received, such as user inputs to the device, as well as any type of audio, video, and/or image data received from any content and/or data source.

The device 902 includes a processing system 910 that may be implemented at least partially in hardware, such as with any type of microprocessors, controllers, and the like that process executable instructions. The processing system 910 can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 902 may further include any type of a system bus or other data and command transfer system that couples the various components within the device. A system bus can include any one or combination of different bus structures and architectures, as well as control and data lines.

The example device 902 also includes computer-readable storage memory 912, such as data storage devices implemented in hardware that can be accessed by a computing device, and that provide persistent storage of data and executable instructions (e.g., software applications, modules, programs, functions, and the like). The computer-readable storage memory 912 described herein excludes propagating signals. Examples of computer-readable storage memory 912 include volatile memory and non-volatile memory, fixed and removable media devices, and any suitable memory device or electronic data storage that maintains data for computing device access. The computer-readable storage memory 912 can include various implementations of random access memory (RAM), read-only memory (ROM), flash memory, and other types of storage memory in various memory device configurations.

The computer-readable storage memory 912 provides storage of the device data 906 and various device applications 914, such as an operating system that is maintained as a software application with the computer-readable storage memory 912 and executed by the processing system 910. In this example, the device 902 includes text wrap modification module 916 that implements the described techniques of text wrap modification using variable inset, and may be implemented with hardware components and/or in software as one of the device applications 914, such as when the example device 902 is implemented as the device 102, the mobile device 400, and/or the computing device 502 shown in respective FIGS. 1, 4, and 5. An example of the text wrap modification module 916 includes the text wrap modification module 104 that is implemented as a software application and/or as hardware components, such as by the device 102, the mobile device 400, and/or the computing device 502, as shown and described with reference to FIGS. 1-8. In implementations, the text wrap modification module 916 may include independent processing, memory, and logic components as a computing and/or electronic device integrated with the device 902.

The device 902 also includes an audio and/or video system 918 that generates audio data for an audio device 920 and/or generates display data for a display device 922. The audio device and/or the display device include any devices that process, display, and/or otherwise render audio, video, display, and/or image data. In implementations, the audio device and/or the display device are integrated components of the example device 902. Alternatively, the audio device and/or the display device are external, peripheral components to the example device 902. In embodiments, at least part of the techniques described for text wrap modification using variable inset may be implemented in a distributed system, such as over a "cloud" 924 in a platform 926. The cloud 924 includes and/or is representative of the platform 926 for services 928 and/or resources 930. For example, the services 928 may include the cloud-based service 524 as shown and described with reference to FIG. 5.

The platform 926 abstracts underlying functionality of hardware, such as server devices (e.g., included in the services 928) and/or software resources (e.g., included as the resources 930), and connects the example device 902 with other devices, servers, etc. The resources 930 may also include applications and/or data that can be utilized while computer processing is executed on servers that are remote from the example device 902. Additionally, the services 928 and/or the resources 930 may facilitate subscriber network services, such as over the Internet, a cellular network, or Wi-Fi network. The platform 926 may also serve to abstract and scale resources to service a demand for the resources 930 that can be implemented via the platform 926, such as in an interconnected device embodiment with functionality distributed throughout the system 900. For example, the functionality may be implemented in part at the example device 902 as well as via the platform 926 that abstracts the functionality of the cloud 924.

Although implementations of text wrap modification using variable inset have been described in language specific to features and/or methods, the appended claims are not necessarily limited to the specific features or methods described. Rather, the specific features and methods are disclosed as example implementations of text wrap modification using variable inset, and other equivalent features and methods are intended to be within the scope of the appended claims. Further, various different examples are described and it is to be appreciated that each described example can be implemented independently or in connection with one or more other described examples.

What is claimed is:

1. A method implemented by at least one computing device, the method comprising:
   displaying lines of text that wrap conforming to an object boundary of a digital object, the lines of text wrapped to an inset space maintained between the object boundary of the digital object and the lines of text;

calculating a first penalty value for a line of text based on a first distance between an end of the line of text and an inset edge of the inset space;

determining a first additional space for extending the line of text based on a variable overlap into the inset space, the variable overlap defining a portion of the inset space into which each of the lines of text are individually permitted to overlap;

extending the line of text to include a first word from a subsequent line of text based on a reduced penalty value for the extended line of text as compared to the first penalty value and a determination that the first word fits within the first additional space;

calculating a second penalty value for the extended line of text based on a second distance between an end of the extended line of text and the inset edge;

determining a second additional space for further extending the extended line of text based on the variable overlap into the inset space;

maintaining the extended line of text without further extending the extended line of text to include a second word from the subsequent line of text based on an increased penalty value for further extending the extended line of text as compared to the second penalty value, the extended line of text maintained despite the second word fitting within the second additional space; and displaying the extended line of text by displaying the first word from the subsequent line of text at the end of the line of text.

2. The method of claim 1, further comprising receiving user input specifying an amount of the inset space and the variable overlap into the inset space.

3. The method of claim 1, wherein the first additional space is between the end of the line of text and into the variable overlap of the inset space, and the second additional space is between the end of the extended line of text and into the variable overlap of the inset space.

4. The method of claim 1, further comprising:
iteratively performing, for each additional line of text of the lines of text:
calculating a penalty value for the additional line of text,
determining an additional space for the additional line of text, and
extending the additional line of text based on the penalty value for the additional line of text and the additional space for the additional line of text; and
displaying each additional line of text as extended to include one or more words from a respective subsequent line of text.

5. The method of claim 1, further comprising:
receiving user input to alter at least one of the lines of text; and
extending the at least one altered line of text based on a reduced penalty value for the at least one altered line of text and a determination that one or more words fit within an additional space for the at least one altered line of text, the extending being iteratively repeated for each line of text subsequent to the at least one altered line of text.

6. The method of claim 1, further comprising:
determining an average of the inset space between the lines of text and a first side of the object boundary of the digital object; and adjusting a width of the inset space between the lines of text and a second side of the object boundary to the average of the inset space.

7. The method of claim 1, wherein the extended line of text extends past the inset edge into the inset space, and the second penalty value is based on a distance by which the extended first line of text extends past the inset edge.

8. A computing device comprising:
a display screen to display lines of text that wrap conforming to an object boundary of a digital object, the lines of text wrapped to an inset space maintained between the object boundary of the digital object and the lines of text; and
a text wrap modification module implemented at least partially in hardware of the computing device to:
calculate a first penalty value for a first line of text based on a first distance between an end of the first line of text and an inset edge of the inset space;
determine a first additional space for extending the first line of text based on a variable overlap into the inset space, the variable overlap defining a portion of the inset space into which each of the lines of text are individually permitted to overlap;
extend the first line of text to include one or more words from a second line of text based on a reduced penalty value for the extended first line of text as compared to the first penalty value and the one or more words fitting within the first additional space;
calculate a second penalty value for the second line of text based on a second distance between an end of the second line of text and the inset edge;
determine a second additional space for extending the second line of text based on the variable overlap into the inset space; and
maintain the second line of text without the second line of text being extended to include a word from a third line of text based on an increased penalty value for extending the second line of text as compared to the second penalty value, the second line of text maintained despite the word fitting within the second additional space.

9. The computing device of claim 8, wherein the text wrap modification module is further configured to receive user input that specifies an amount of the inset space and the variable overlap into the inset space.

10. The computing device of claim 8, wherein the first additional space is between the end of the first line of text and into the variable overlap of the inset space, and the second additional space is between the end of the second line of text and into the variable overlap of the inset space.

11. The computing device of claim 8, wherein, to extend the first line of text, the text wrap modification module is configured to iteratively include a next word from the second line of text resulting in the reduced penalty value and the next iterative word fitting within the first additional space.

12. The computing device of claim 8, wherein the text wrap modification module is further configured, for each additional line of text of the lines of text, to iteratively:
calculate a penalty value for the additional line of text;
determine an additional space for the additional line of text;
extend the additional line of text based on the penalty value for the additional line of text and the additional space for the additional line of text; and
the text wrap modification module being further configured to initiate to display, on the display screen, each additional line of text as extended to include one or more words from a respective subsequent line of text.

13. The computing device of claim 8, wherein the text wrap modification module is further configured to:
   receive user input to alter at least one of the lines of text; and
   extend the at least one altered line of text based on a reduced penalty value for the at least one altered line of text and a determination that one or more words fit within an additional space for the at least one altered line of text.

14. The computing device of claim 8, wherein the text wrap modification module is further configured to:
   determine an average of the inset space between the lines of text and a first side of the object boundary of the digital object; and
   adjust a width of the inset space between the lines of text and a second side of the object boundary to the average of the inset space.

15. A method implemented by at least one computing device, the method comprising:
   displaying lines of text that wrap conforming to an object boundary of a digital object, the lines of text wrapped to an inset space maintained between the object boundary of the digital object and the lines of text;
   determining a first additional space for extending a first line of text based on a variable overlap into the inset space, the variable overlap defining a portion of the inset space into which each of the lines of text are individually permitted to overlap;
   extending the first line of text to include one or more words from a second line of text based on a first penalty value for extending the first line of text being reduced and the one or more words fitting within the first additional space;
   determining a second additional space for extending a second line of text based on the variable overlap into the inset space;
   maintaining the second line of text without extending the second line of text to include a word from a third line of text based on a second penalty value for extending the second line of text being increased, the second line of text maintained despite the word fitting within the second additional space;
   determining an average of the inset space between the lines of text and a first side of the object boundary of the digital object; and
   adjusting a width of the inset space between the lines of text and a second side of the object boundary based on the average of the inset space.

16. The method of claim 15, further comprising receiving user input specifying an amount of the inset space and the variable overlap into the inset space.

17. The method of claim 15, wherein the extended first line of text and the second line of text are displayed on the first side of the object boundary, and the average of the inset space is between the first side of the object boundary and the first and second lines of text as adjusted to include the one or more words from the second line of text in the first line of text.

18. The method of claim 15, further comprising:
   iteratively performing, for each additional line of text of the lines of text:
      determining an additional space for the additional line of text, and
      extending the additional line of text based on the additional space for the additional line of text and a determined penalty value.

19. The method of claim 18, wherein the average of the inset space is determined using the determined penalty values for the lines of text displayed on the first side of the object boundary.

20. The method of claim 15, wherein the adjusting the width of the inset space between the lines of text and the second side of the object boundary includes adjusting a positioning of the digital object based on the average of the inset space.

* * * * *